(12) United States Patent
Royer et al.

(10) Patent No.: US 7,725,385 B2
(45) Date of Patent: May 25, 2010

(54) SYSTEM AND METHOD FOR FACILITATING THE HANDLING OF A DISPUTE USING DISPARATE ARCHITECTURES

(75) Inventors: Coby Royer, St. Louis, MO (US);
Judith Continelli, Glendale, AZ (US);
Sandra Hazeltine, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1511 days.

(21) Appl. No.: 10/391,492

(22) Filed: Mar. 18, 2003
(Under 37 CFR 1.47)

(65) Prior Publication Data
US 2004/0006539 A1    Jan. 8, 2004

Related U.S. Application Data

(63) Continuation-in-part of application No. 09/537,506, filed on Mar. 29, 2000, now Pat. No. 7,249,113.

(60) Provisional application No. 60/420,186, filed on Oct. 22, 2002.

(51) Int. Cl.
*G06Q 40/00* (2006.01)
(52) U.S. Cl. .................................................. 705/38
(58) Field of Classification Search ................ None
See application file for complete search history.

(56) References Cited

U.S. PATENT DOCUMENTS

| | | | |
|---|---|---|---|
| 5,334,823 A | | 8/1994 | Noblett, Jr. et al. |
| 5,357,563 A | | 10/1994 | Hamilton et al. |
| 5,386,458 A | | 1/1995 | Nair et al. |
| 5,432,326 A | * | 7/1995 | Noblett et al. ............... 235/380 |
| 5,479,530 A | | 12/1995 | Nair et al. |
| 5,590,038 A | | 12/1996 | Pitroda |

(Continued)

OTHER PUBLICATIONS

Alruraih, S. et al., "Soft-products fraud prevention using trusted delivery," WSEAS Transactions on Business and Economics, vol. 2, No. 2, p. 88-93.*

(Continued)

*Primary Examiner*—Hani Kazimi
*Assistant Examiner*—Michael R Zecher
(74) *Attorney, Agent, or Firm*—Fitzpatrick, Cella, Harper & Scinto

(57) ABSTRACT

A system is disclosed for handling post transactional credit disputes in real-time via a variety of transactional environments and architectures. The system includes one or more workstations linked to a communication channel and one or more servers with at least one having capability of displaying a plurality of pre-existing dispute handling forms. A party in dispute may access the forms, choose an appropriate dispute handling form, provide data in the pre-defined requested fields on the form, and transmit the form over the communication channel to a server for processing. A server accepts a User ID and password from a user, retrieves and displays a set of dispute handling forms, receives input entered on the forms, routes the forms to a second user in dispute, and makes the forms available for viewing to the second user. The program may further index the data entered on the forms using a code-based method.

17 Claims, 17 Drawing Sheets

U.S. PATENT DOCUMENTS

| | | | |
|---|---|---|---|
| 5,604,802 A | 2/1997 | Holloway | |
| 5,649,117 A | 7/1997 | Landry | |
| 5,668,953 A | 9/1997 | Sloo | |
| 5,671,282 A | 9/1997 | Wolff et al. | |
| 5,699,528 A | 12/1997 | Hogan | |
| 5,826,241 A | 10/1998 | Stein et al. | |
| 5,860,066 A | 1/1999 | Rouse | |
| 5,874,717 A | 2/1999 | Kern et al. | |
| 5,878,139 A * | 3/1999 | Rosen | 705/75 |
| 5,895,450 A | 4/1999 | Sloo | |
| 5,895,455 A | 4/1999 | Bellinger et al. | 705/35 |
| 5,910,988 A | 6/1999 | Ballard | |
| 5,991,733 A | 11/1999 | Aleia et al. | |
| 5,995,948 A * | 11/1999 | Whitford et al. | 705/41 |
| 6,039,248 A | 3/2000 | Park et al. | 235/379 |
| 6,330,551 B1 * | 12/2001 | Burchetta et al. | 705/80 |
| 6,336,095 B1 | 1/2002 | Rosen | 705/1 |
| 6,343,279 B1 | 1/2002 | Bissonette et al. | |
| 6,687,714 B1 * | 2/2004 | Kogen et al. | 707/200 |
| 6,801,900 B1 * | 10/2004 | Lloyd | 705/10 |
| 6,954,741 B1 * | 10/2005 | Burchetta et al. | 705/80 |
| 7,076,462 B1 * | 7/2006 | Nelson et al. | 705/38 |
| 7,356,516 B2 | 4/2008 | Richey et al. | 705/80 |
| 2001/0037204 A1 | 11/2001 | Horn et al. | 705/1 |
| 2001/0044756 A1 * | 11/2001 | Watkins et al. | 705/26 |
| 2001/0047332 A1 * | 11/2001 | Gonen-Friedman et al. | 705/40 |
| 2002/0011431 A1 * | 1/2002 | Graef et al. | 209/534 |
| 2003/0078880 A1 | 4/2003 | Alley et al. | 705/38 |
| 2004/0059596 A1 * | 3/2004 | Vaidyanathan et al. | 705/1 |
| 2004/0148234 A1 * | 7/2004 | Gonen-Friedman et al. | 705/30 |
| 2005/0178824 A1 * | 8/2005 | Benson et al. | 235/380 |

OTHER PUBLICATIONS

Skevington, P.J. et al., "Trusted third parties in electronic commerce," Internet and beyond, Chapman & Hall, London, UK, 1998, pp. 51-61.*

"Retailers Discouraged from Increasing Card Transactions," Retail Week, UK, Apr. 10, 1992, p. 1.*

"Sybase Industry Warehouse Studio Selected by Global Card," PR Newswire, Jun. 24, 2003.*

* cited by examiner

SYSTEM AND METHOD FOR FACILITATING THE HANDLING OF A DISPUTE USING DISPARATE ARCHITECTURES

CROSS REFERENCE TO RELATED APPLICATIONS

This application is a continuation-in-part of, and claims priority from, U.S. patent application Ser. No. 09/537,506 filed Mar. 29, 2000 now U.S. Pat. No. 7,249,113, which is hereby incorporated by reference. This application also claims priority from U.S. Provisional Patent Application Ser. No. 60/420,186 filed Oct. 22, 2002 under the same title, which is hereby incorporated by reference.

FIELD OF INVENTION

The invention relates generally to a system and method for handling disputes and, more particularly to a real-time dispute processing system and method for resolving post transactional credit disputes in a variety of transactional environments and architectures.

BACKGROUND OF THE INVENTION

With increasing popularity, consumers worldwide are purchasing goods and services on credit. For many purchasers, the most convenient form of payment is a plastic card with a magnetic stripe, an embossed account number and/or a smart chip called a credit card (hereafter "card" or "cards").

Cards may be used at service establishments (S/Es) (e.g., automated teller machines (ATM), point of sale (POS), and instances when no card is used during the transaction such as purchases over the Internet) that have entered into agreements with an Acquirer for the S/E to accept cards from cardmembers to charge purchases of goods and services or for cash access. An Acquirer may be, for example, a nonfinancial or financial entity that specializes in the marketing, installation and support of POS card acceptance at S/Es. Acquirers generally negotiate a contract with the S/E to accept a brand of cards (e.g., AMERICAN EXPRESS®, VISA®, MasterCard®, DISCOVER CARD®).

Card Issuers are typically banks and other financial organizations (e.g., Bank of America®, Citibank®, MBNA America®, Chase Manhattan Bank®) operating under the regulations of a card issuing association or entity. The cardmember enters into an agreement and establishes a card account with the Issuer. The Issuer's name generally appears on the card and cardmember's payments are typically sent to that Issuer.

Occasionally cardmembers may receive unsatisfactory goods or services from the S/E, be involved with a dispute over price with the S/E, or the S/E may have failed to comply with the regulations and/or terms of its card acceptance agreement with the Acquirer. Typically the cardmember then notifies the Issuer about the dispute with the S/E, which prompts the Issuer to begin a dispute resolution process with the Acquirer on behalf of the cardmember. Alternatively, the Issuer may begin the dispute process in the absence of any cardmember complaint, for example when the S/E fails to comply with regulations and/or terms.

In order to substantiate the dispute claim, the Issuer may first make a "retrieval request" to the Acquirer. The receipt for a cardmember's purchase or credit transaction containing the details of any transaction carried out at the S/E is called the record of charge (ROC). A retrieval request may include a request for either an original ROC, a legible reproduction of the ROC, or any other transactional documentation from the Acquirer. The documentation supplied by the Acquirer in reply to a retrieval request is called "fulfillment."

A typical "chargeback" is a reversal of a credit transaction which is "chargedback" to the Acquirer from the Issuer. The Acquirer may refute the chargeback and process a "second presentment" to the Issuer with additional documentation. A "final chargeback" by the Issuer to the Acquirer occurs if the Issuer refutes the "second presentment" by providing additional documentation.

The aforementioned dispute handling process between cardmembers, Issuers, Acquirers and/or S/Es is largely a manual documentation gathering process. Each step, beginning with the retrieval request, includes copying, mailing or faxing documentation. The entire manual process may consume valuable employee time and resources. Furthermore, while the dispute is being settled, the charge remains pending on either the cardmembers account or on unreconciled billings.

Communication between the parties (i.e., cardmember, Issuer, Acquirer, S/E) is on-going until the dispute is settled. In the above-described known dispute processes involving non-electronic transmission of documentation, communication may only occur during normal business hours. This can be difficult due to varying time zones. Thus, there exists a need for streamlining post-transactional credit disputes by providing electronic transmission of documentation.

Accordingly, there exists a need for a credit dispute system and method that increases the efficiency of the process. More particularly, there is a need for a system and method of processing a credit dispute that allows an initiator (such as an Issuer) to begin a dispute process by, for example, initiating a retrieval request to a responder (such as an Acquirer), then allowing the responder to fulfill the request in a real-time processing environment.

Moreover, data interchange between parties can be problematic if the interchange is between disparate users and systems. For example, each party (e.g., Issuer and Acquirer) may have their own systems infrastructure which may include, for example, their own servers respectively. Alternatively, a central server may be used, but the process of multiple parties accessing the server from their own infrastructures may be inefficient, costly and/or complicated. Thus, there exists a need for a credit dispute system and method that provides a well-defined and adaptable data interchange format to facilitate communication with multiple parties, and their respective system infrastructures with minimal error.

SUMMARY OF THE INVENTION

The present invention overcomes the problems outlined above and provides an improved system and method for facilitating, processing and retrieving documentation for the handling of a post-credit dispute between an initiator and a responder. In particular, the present invention provides a real-time dispute processing system that uses the speed and efficiency of the Internet, or similar communication system, to facilitate the handling of credit disputes.

In an exemplary embodiment of the invention, the system includes first and second workstations capable of receiving commands from dispute-resolution initiators and responders, a server in communication with said workstations, a database having a plurality of dispute handling forms stored thereon, and a communication channel coupling the workstations and the database. The forms capable of being viewed on and field-populated by the workstations and transmitted between the workstations. The initiator selects an initiator form from an initiator form selection and transmits the initiator form to the responder. The responder views the initiator form and selects a responder form from a responder form selection and transmits the responder form to the initiator and so on.

An exemplary method of the invention, executed in a network computer system having a first and second client system, includes retrieving a plurality of digitally represented dispute handling forms and transmitting a form from the first client to the second client, thereby initiating resolution of a post-transactional credit dispute. Notifying the second client of the form and the second client reviews the form received from the first client. The second client retrieves a second plurality of forms and one form is transmitted to the first client system, thereby responding to the credit dispute.

BRIEF DESCRIPTION OF THE DRAWINGS

These and other features, aspects and advantages of invention may be best understood by reference to the following description taken in conjunction with the accompanying drawings in which like numerals represent like elements.

DETAILED DESCRIPTION OF THE INVENTION

1. Definitions

Figure 1:
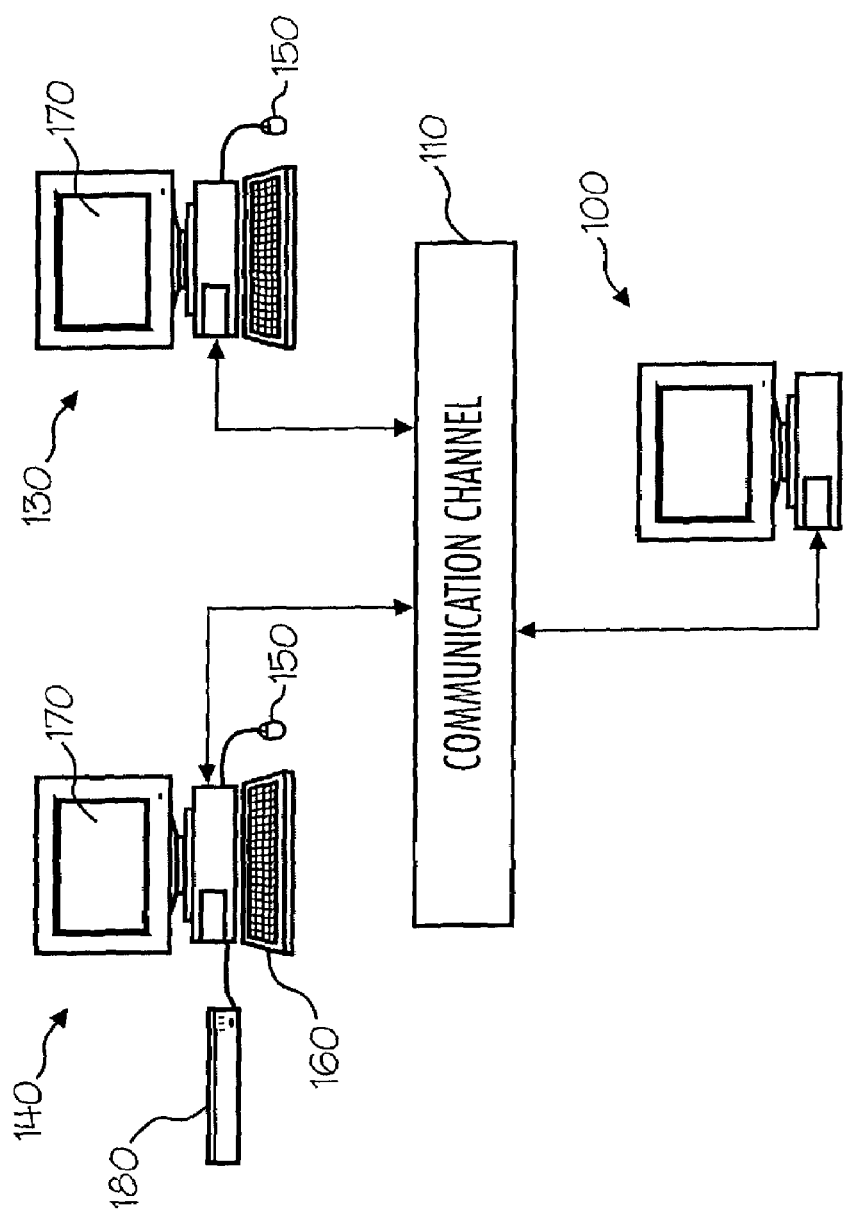
FIG. 1 illustrates a real-time dispute processing system in accordance with an exemplary "simple resolver" architecture of the present invention.

The following definitions apply to words and/or terms used herein and are offered to clarify their use and intended meaning and not as a means of limitation.

ACQUIRER: An entity that markets, installs, and supports POS transaction card acceptance at SEs, and typically negotiate a contract with the SE to accept certain brands of cards.

CARD: A transaction instrument such as a charge card, credit card, debit card, awards card, prepaid card, telephone card, smart card, magnetic stripe card, bar code card, transponder, radio frequency card and/or the like having an account number, which cardholders typically present to Service Establishments (SEs), as part of a transaction, such as a purchase. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

CARDMEMBER: An entity, typically an individual person or corporation, that has been issued a card or is authorized to use a card (also known as a "cardholder").

CARDMEMBER REQUEST: A request from an Issuer to a Cardmember which requests information and possibly documents in support of a Dispute claim, or to provide the Cardmember response to information from the First Fulfillment or Second Presentment. Not all Cardmember Requests shown would typically occur. For example, an Issuer may not need any additional information from a Cardmember in processing a dispute.

CARDMEMBER RESPONSE: A response from a Cardmember to an Issuer which supplies information and possibly documents in support of a Dispute claim, or to provide the Cardmember response to information from the First Fulfillment or Second Presentment. In various embodiments, not all Cardmember Responses shown would typically occur. For example, an Issuer may not need any additional information from a Cardmember in processing a dispute.

CHARGEBACK: A reversal of a credit transaction which is "charged-back" to the Acquirer from the Issuer. There are two aspects to a Chargeback, the Chargeback Notification and the Chargeback Adjustment. There are also two types of Chargebacks, the Initial Chargeback and Final Chargeback. Within this document, the term Chargeback denotes Chargeback Notification, unless otherwise noted.

CHARGEBACK ADJUSTMENT: The transactional component of a Chargeback which is responsible for funds transfer that is described by a Chargeback Notification. The Chargeback Adjustment effects the actual transfer of funds between Acquirer and Issuer and may be a manual or automated process. Additional Chargeback Adjustments may take place between the cardmember and Issuer, and between the Acquirer and SE. Several possible Chargeback Adjustments may be depicted in the Figures, however these are for general illustration of probable adjustments and not all adjustments shown would typically occur.

CHARGEBACK NOTIFICATION: The communication that transpires from Acquirer to Issuer during a Chargeback and which identifies the reversal of the initial transaction. It contains information about the original transaction and any associated Chargeback Executions. It does not effect any actual transfer of funds, but rather, provides information about such a transfer. Within this document, the term Chargeback Notification is abbreviated to simply CHARGEBACK.

DISPUTE CLAIM: Any request that may initiate a dispute resolution process (e.g., from a cardmember to an Issuer; from an Issuer to an Acquirer). It includes information about a disputed charge as might occur when a cardmember receives unsatisfactory goods or services, or where the SE failed to comply with regulations and/or terms of the card acceptance agreement with the Acquirer. For example, a cardmember may initiate a dispute claim by a phone call or online correspondence with a customer service representative of the Issuer agency. However, before a dispute claim is complete, the cardmember may also need to provide information in writing and may also provide supporting documentation such as the customer copy of the receipt of charge (ROC).

FINAL CHARGEBACK: A Chargeback from the Issuer to the Acquirer that may occur after a Second Presentment.

FIRST CHARGEBACK: Also known as an INITIAL CHARGEBACK, is the first Chargeback from the Issuer in response to the Retrieval Request.

FULFILLMENT: The response that an Acquirer sends to an Issuer in response to a Retrieval Request, and includes information and possibly documents in support of a Dispute claim.

ISSUER: Typically a bank or other financial institution typically operating under regulations of a card issuing association or entity and which issues cards to cardmembers under a cardmember agreement for a cardmember account.

RECEIPT OF CHARGE (ROC): The document generated when a SE executes a transaction with a cardmember. It is often signed by the customer, and a copy is often retained by both customer and SE.

RETRIEVAL REQUEST: A request from an Issuer to an Acquirer for information and possibly documents in support of a dispute claim. A Retrieval Request may also be submitted in the absence of a dispute claim if an Issuer, as opposed to the cardmember, identifies a transaction that it wishes to dispute.

SECOND PRESENTMENT: A response from the Acquirer to the Issuer in response to an Initial Chargeback, and is generated when the Acquirer wishes to refute the Initial Chargeback.

SERVICE ESTABLISHMENT (SE): Also known as a merchant, is any entity, individual, organization, software and/or hardware that supports a transaction using a card or information derived from a card. SEs may be automated teller machines (ATMs), Point of Sale (POS) devices, retailers, etc. bound to agreements with Acquirers to accept cards from cardmembers to charge purchases of goods and services or for cash access.

SE REQUEST: A request from an Acquirer to an SE which requests information and possibly documents in support of a Retrieval Request or Chargeback. In various embodiments, not all SE Requests shown in the Figures would typically occur. For example, an Acquirer might already have sufficient information to generate a Fulfillment without issuing an SE Request.

SE RESPONSE: A response from an SE to an Acquirer which supplies information and possibly documents in support of a Retrieval Request or Chargeback. In various embodiments, not all SE Responses shown in the figures would typically occur. For example, if an Acquirer does not generate an SE Request, then no SE Response would follow.

2. Detailed Description of Exemplary Embodiments

The present invention relates to an improved system and method for facilitating the handling of credit disputes using a real-time dispute processing system. Although the system may be suitable for a variety of dispute processing applications, (e.g., customer billing disputes, disputes including the exchange of information between customers and vendors or creditors) the present invention is conveniently described with reference to the credit disputes between Issuers and Acquirers.

The subject matter of the present invention is particularly suited for use in connection with post transactional credit disputes between Issuers, Acquirers, cardmembers and merchants. As a result, an exemplary embodiment of the present invention is described in that context. It should be recognized, however, that such description is not intended as a limitation on the use or applicability of the present invention, but instead is provided merely to enable a full and complete description of an exemplary embodiment.

The various embodiments of the invention may be adapted to any number of systems architectures and environments. For instance, depending on the particular systems of the parties participating in the dispute resolution transaction, the systems and methods of the invention can be varied to accommodate data interchange between the parties. Described herein are three exemplary systems architectures and their various embodiments: simple resolver, external resolver, and business-to-business (B2B). It should be appreciated that the flowcharts are described in connection with only one of the architectures, i.e., simple resolver; however, the systems and methods disclosed in the description and by the flowcharts are equally adaptable to various other architectures including, but not limited to, the external resolver and B2B architectures.

Simple Resolver Architecture

In an exemplary embodiment, the Internet-based processing system of the present invention is illustrated in FIG. 1. One skilled in the art will appreciate that the system may also operate on an intranet, extranet, LAN, WAN or any other network or with any other device for use on a communication system, such as a personal digital assistant (PDA), smart phone, or any other suitable communication device.

The architecture embodied in FIG. 1 illustrates and describes a central server having a website and/or Internet capabilities. Computer interfaces may be used to retrieve suitable documentation in a purely electronic form, such as an existing scan of the ROC or an electronic facsimile of the ROC, as might be generated by an all electronic transaction that occurs on the Internet.

A central server 100 having web site information and web page applications stored thereon is linked to a communication channel 110. Central server 100 maintains an operating computer program for the web site. The computer may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Central server 100 may include one or more databases of any type, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is the same in one embodiment. However, data tables having similar, though not identical, data in the key fields may also be merged by using AGREP, for example.

Communication channel 110 facilitates communication between the parties to the transaction and the system of the present invention. Channel 110 may be any suitable communication means for exchanging data or transacting business, such as, a telephone network, Intranet, Internet, extranet, WAN, LAN, satellite communications, point of interaction device (point of sale device, personal digital assistant, cellular phone, kiosk, etc.), online communications, off-line communications, wireless communications, transponder communications and/or the like. It is noted that the channel may be implemented as other types of networks, such as an interactive television (ITV) network.

Exemplary internet or intranet (depending on the user access channel) capable terminals 130 and 140 are provided for end-users to access the web site via communication channel 110. User computer can be in a home or business environment with access to a network. In an exemplary embodiment, access is through the Internet through a commercially-available web-browser software package. Each terminal 130 and 140 is, in one embodiment, equipped with a display 170 and an input means. As an example, display 170 may be a terminal screen or any other suitable display. Data is entered by the user with any known data input means. As shown, terminals 130 and 140 are equipped with a point and click input means (e.g., a mouse) 150 and a keyboard input means 160. Input means 150 and 160 are merely an example and not intended to limit the scope of the invention, for example, voice recognition, touch screen methods, kiosk, personal digital assistant, handheld computers (e.g., Palm Pilot®), cellular phones, and/or the like, are also available. Terminals 130 and 140 include, in one embodiment, personal computers including but not limited to, a PENTIUM® PC, and include a minimum of 32 MB RAM, a 28.8 baud rate modem or company LAN (local area network) access, and 400 MB of available disk space on a local hard drive or network. Terminals 130 and 140 may include a compression software such as WINZIP® 7.0 or greater, an operating program such as WINDOWS 95/98/2000®, WINDOWS NT®, Linux, Solaris, etc, an application such as WINDOWS EXPLORER® 4.0 with update version Service Pack 1 or greater, or NETSCAPE NAVIGATOR® version 4.07 or greater, as well as various conventional support software and drivers typically associated with computers. In addition, terminals 130 and 140 may include a machine that does not require human interaction.

Additionally, the system may include a document scanning device 180. As shown in FIG. 1, terminal 140 is coupled to a scanning device 180. Terminal 130 can also be coupled to a similar scanning device. Scanning device 180 may have a resolution of at least 600 dpi. Supporting documentation is suitably transformed into computer readable format by scanning device 180. For example, an end-user operating scanning device 180 can scan receipts, rental agreements, hotel folios and the like, and then store the scanned data on the hard drive of terminal 140. Such supporting documentation can then be transmitted to server 100. In one embodiment, the user's system includes a scanner and TWAIN driver. When the user accesses a form that supports attachment of a scanned image, the user action invokes an active client component in the form of a Java component or ActiveX control, downloading it first if necessary (e.g., click on a button and cause an HTTP POST).

The inclusion of a scanner coupled to the user terminal is a variant for all architectures described herein. The scanner may be either present or not present (i.e., it is optional) for each basic architecture One skilled in the art can appreciate that an alternative embodiment might use a desktop application to perform the described image viewing and manipulation.

An exemplary method of the present invention may be executed in a network computer system with a computer program that controls the operation of server 100. The computer program may be suitably stored on server 100 by methods common to one skilled in the art, such as, for example, in the read-only-memory (ROM) or the hard drive memory of server 100. An exemplary network computer system of the present invention is illustrated as FIG. 1.

User Access

Figure 2:
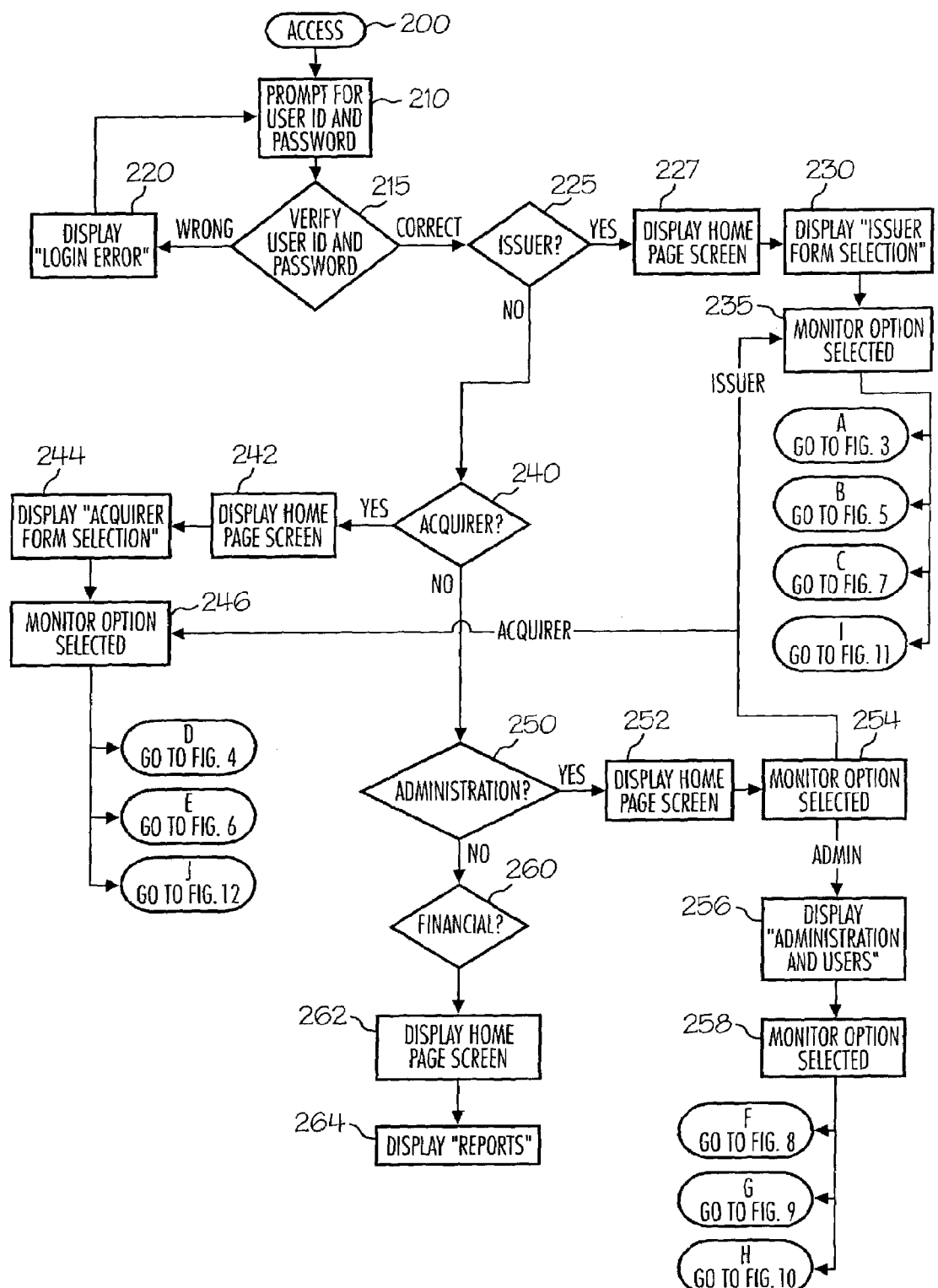
FIG. 2 a computer program flow chart illustrating an exemplary embodiment for accessing the system of the present invention.

FIG. 2 summarizes the steps performed by the computer program while executing one exemplary method of the present invention. These steps are merely illustrative and can be modified or adapted. The user (e.g., Issuer, Acquirer, administrative and financial personnel, cardmember, S/E) completes a User ID request and receives a User ID and password. User IDs and passwords are unique to specific users and are stored on the server database.

A first end-user, for example an Issuer, accesses the web site (step 200) by any known Internet browser means such as MICROSOFT INTERNET EXPLORER® or NETSCAPE NAVIGATOR®. The user may go through an authentication process such as entering an ID and password (step 210). Note that the user may be a person, such as Acquirer or Issuer, or a computer host or system, such as Acquirer infrastructure or Issuer infrastructure. The mechanism for authentication defines a variant, for which there are generally many alternatives. For instance, the process of authentication may include receiving and processing credentials, which is the information the receiving system uses to confirm the identity of the user. The user ID and password are credentials. Although credentials in general may be of many different forms, three basic categories of credentials may include, (1) who you are; (2) what you have; and (3) what you know. The first category, "who you are", equates to biometrics, and can be described as any characteristic intrinsic to the physical manifestation of the user. Examples are fingerprints, retinal patterns, and DNA. The second category, "what you have", includes, for example, systems the user is physically in possession of. In such systems, the credential the user possesses generally interfaces with the authentication systems. Alternatively, the user may mediate the interface to the system, as occurs when the user keys in digits that are displayed on a security token device. Examples of suitable second category systems include an X.509 digital certificate (e.g., stored in a certificate store on a workstation), smart card, Fortezza® card, etc. The third category, "what you know", may include a password, passphrase, identification number such as social security number, answer to a question such as what is your pet's name, etc. Variation in authentication includes the above as well as various other types of credentials known or to be discovered by those skilled in the art.

The authentication variant may be further defined by means of entry. Point of entry variation is typically seen at the point in processing where the user initially provides credentials. For instance, variation may occur in the types and implementations of the user's devices and in the communication form the user's systems to other systems. For biometrics, there are many possible types of interface devices, and these devices will employ communication to the underlying workstation or host. In an exemplary embodiment based on biometrics, the biometric interface device (for example, a retinal scanner) employs a secure protocol and possibly asymmetric key cryptography. Such processing provides the retinal scan data to the receiving systems in a way that does not compromise privacy or integrity, but is resistant to replay attacks that allow eavesdropping devices to monitor and record the communication between the biometric interface device and the connected machine for later replay.

Considerable variation is possible for X.509 certificates, which might be stored on a smart card, user workstation, or other device. A system based on certificates typically includes a mechanism for the user to "unlock" the key store that contains the certificate to be used. Some smart card readers include a keypad for entering of a personal identification number that unlocks the key store on the smart card device. Many key stores include password protection, wherein a user enters a password before releasing certificates. Most HTTP web browsers include a X.509 key store that can be used to store X.509 certificates that can be exchanged with a web server during client certificate authentication process that can be part of HTTP communications based on the Secure Sockets Layer (SSL) protocol version 3.

Point of entry variation also may also occur in the presentment of the third category of credentials, "what a user knows." For example, when a user enters a password, it may be passed directly to the receiving system. In one embodiment, the password is protected by means of processing known as a "one way hash", as is used in the UNIX operating system. In this embodiment, when the user ID and password are matched with a database on the authenticating system, the hashed password is matched as opposed to the plaintext password. Entry of the credential may also include a variety of mechanisms, such as a WINDOWS security dialog, as would be seen with Microsoft Internet Explorer, and a web form as may be presented by a web browser such as Microsoft Internet Explorer or Netscape Navigator.

Other stages in processing may include the transfer of credentials to an authentication system, and the subsequent processing by that system. Authentication systems themselves may be embodied by machines that are distinct from the machines depicted in the architectures of this invention. For example, under Microsoft Windows authentication, a Domain Server or Active Directory Server houses the authentication system and performs authentication on behalf of other machines that authenticate users, such as a web server acting as an Issuer Host (e.g., Issuer Host 1135 of FIG. 13). Alternatively, an authentication system may reside on the same machines that include authentication.

The exact processing by the authentication system often depends on point of entry processing as well as other factors. One mechanism that may be used to securely transmit credentials is SSL, in which case both the workstation at which the user enters credentials and the server with which the user interacts performs processing in accord with the SSL protocol.

With continued reference to FIG. 2, after accessing the web site, the program stored on server 100 may be configured to prompt the end-user for a User ID and password (step 210). The User ID and password are verified (step 215) and if they do not correspond to a known (stored) User ID and password, the program displays a "Logon Error" message (220) and returns to the previous screen (step 210).

Once the Issuer, or any User, has been authenticated by matching the entered User ID and password with a database located on the server, the Issuer may be presented (or authorized) with only those functions the Issuer is authorized to use (e.g., Issuers may be presented with only Issuer functions and Acquirers may be presented with only Acquirer functions). "Authorization" is a mechanism that determines what kinds of actions a user is permitted to take, based upon their security realm or identity that was established during authentication. "Workflow" is the possible actions presented to a user in interacting with a system. In one embodiment, the identity of the user is established during authentication and the systems will determine whether they are an Acquirer or Issuer. If they are an Acquirer, then the workflow of the system might automatically direct them to user interface elements that are useful to an Acquirer, such as forms for reviewing retrieval requests, creating fulfillments, reviewing chargebacks, creating second presentments, and reviewing final chargebacks. If a user were to attempt to access screens for a different type of user, authorization denies access to those screens. Authorization and workflow can be implemented in many different ways using standard tools and methodologies such as HTML coding and server side scripting with Application Server Pages (ASPs) and NET components under Microsoft Internet Information Server (IIS) or else using HTML coding, Java Server Pages (JSP), and Java Servlets, with a web server that handles Java servlets and JSPs.

The program is configured to respond to the entry of the User ID and password with a set of queries to determine what type of user has been verified (e.g., Issuer, Acquirer, administration, financial). If the entered User ID and password correspond to an Issuer (step 225), the program causes the "home page" to display (step 227). In general, "home page" is a term used in the industry to indicate a main or central screen from which the user can select options. One skilled in the art will recognize that "home page" options may be included throughout a routine or sub-routine to allow the user to return to the main or central screen at any time and start over with another routine. From the home page, the Issuer chooses the option to begin a dispute handling process and the program causes the display "Issuer Form Selection" (step 230).

If the entered User ID and password do not correspond to an Issuer, the program is configured to query if the entered data is for an Acquirer (step 240). In a similar manner as described for the Issuer, if the user is an Acquirer, the home page is displayed (step 242) and the program causes the display "Acquirer Form Selection" (step 244). Because the User ID and password are unique for each type of exemplary user (Issuer, Acquirer, administration, financial), the program is configured to determine what type of user is accessing and to continue if the entered data is for neither an Issuer or an Acquirer.

Administrative personnel (AP) perform such functions as issuing User IDs and passwords or any other administrative function which may be needed to provide "system service" to other users (e.g., add, delete, modify User IDs). If the entered User ID and password correspond to AP (step 250), the home page screen is displayed (step 252). It is desirable to give AP access rights to both Issuer, Acquirer and administrative functions and/or forms. Often, AP initiate a dispute or respond to a dispute instead of the Issuer or Acquirer. In other words, AP can access the forms available to an Issuer or an Acquirer and complete the forms on behalf of and at the direction of the Issuer or Acquirer. AP are given an option (step 254) from the home page screen to choose "Dispute Handling," which gives AP the option of either Issuer forms or Acquirer forms, or to choose "Admin." The "Admin" option causes the program to display the "Administration" screen which contains a list of all active and inactive users that have been assigned a User ID and password (step 256). The AP can choose a function from the "Administration" screen and the option is monitored by the program (step 258).

In the exemplary embodiment as described above, if the entered User ID and password does not correspond to any of the above types of users, the system may default to assume the user is financial personnel (FP) (step 260). (Step 215 verifies that the User ID and password corresponds to a single type of user; only one user type is remaining). The FP perform settlement and funds exchange between the other users, namely Issuers and Acquirers. The program causes the home page to display (step 262). FP may be given limited access to reporting functions and the like, or similar functions which enable FP to settle funds. For this reason, FP may be given a single option to choose from off the home page. In one exemplary embodiment, the option is reporting and the program causes the display "Reports" (step 264).

Upon display of the "Form Selection" screen for either the Issuer or the Acquirer, the program monitors the response of the user for one of the options presented on the display (step 235) (step 246). In an exemplary embodiment, the program causes a display which allows the user to choose from dispute handling forms.

In practice, the Issuer is typically notified by a cardmember that there is an unresolved dispute with the S/E, for example, the cardmember may have received unsatisfactory goods or services or there may be a discrepancy in the price paid. The Issuer then begins the dispute handling process with the Acquirer on behalf of the cardmember. Once the Issuer is authenticated by the program, and the "Issuer Form Selection" menu is displayed, the Issuer may begin the process by completing an online retrieval request form.

In various embodiments of the systems and methods described, there may be included one or more rules engines capable of automating some of the processes without human interaction. These systems components may be configured to perform such functions as letter generation, email generation, and other messaging to notify a human that some sort of interaction is desired. The result of such automation might be the termination or elimination of some of the process steps. For example, identification of duplicate transactions within the Issuer Infrastructure might lead directly to a chargeback without requiring a retrieval request from the Acquirer. It should be recognized that the various steps illustrated in the Figures and the accompanying descriptions reflect the possibility of automated processing.

Retrieval Request

Figure 3:
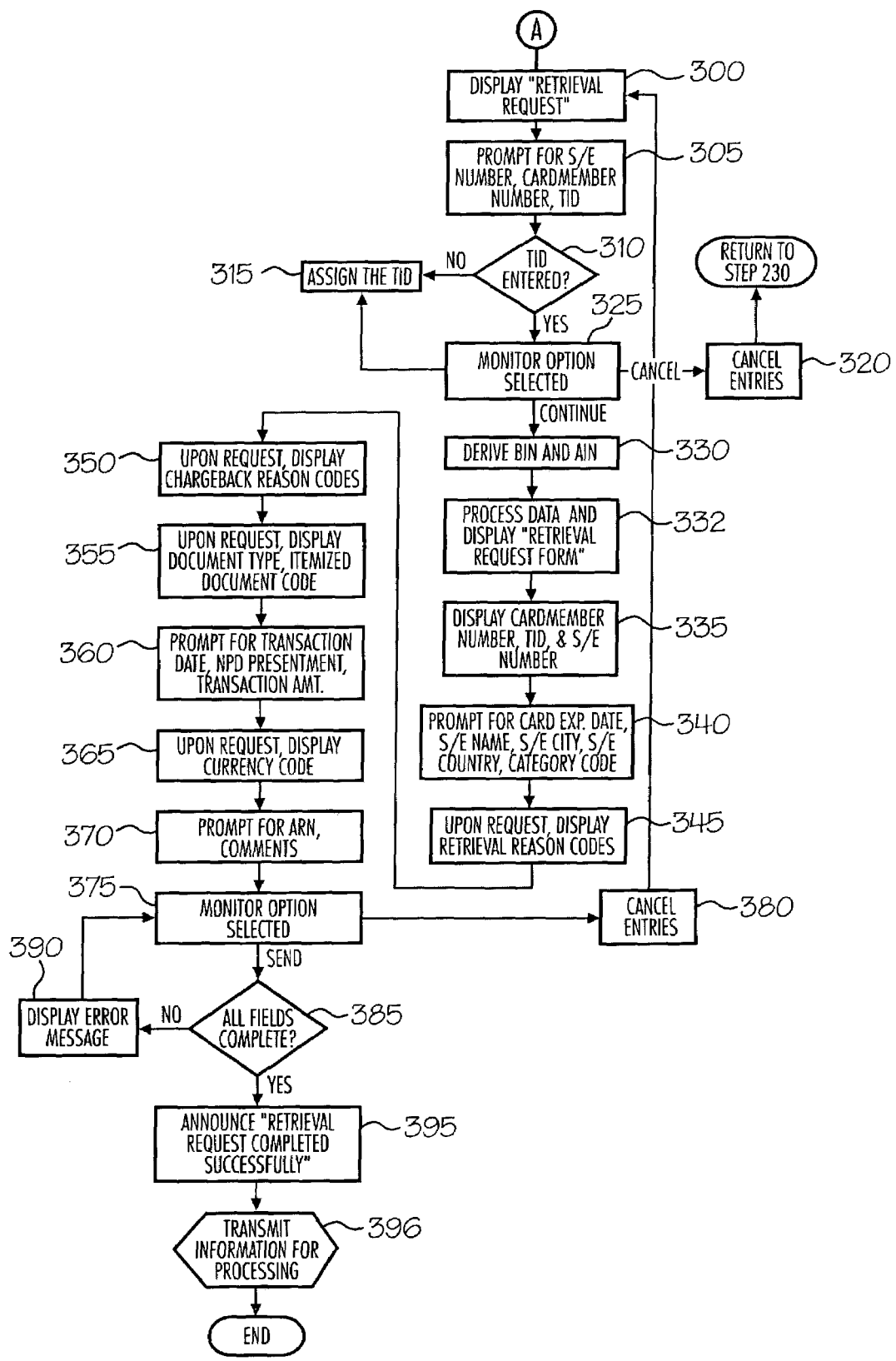
FIG. 3 is a continuation of FIG. 2 illustrating a "Retrieval Request" embodiment of the present invention.

Referring to FIG. 3, upon selection of "Retrieval Request," the program causes the display "Retrieval Request" (step 300). Throughout the form, the program prompts the Issuer to enter data with respect to the unresolved dispute. The Issuer is asked to provide information which will help the Acquirer to recognize the disputed matter and to promote a fast response time. The requested data can vary according to the dispute application, however, in the sake of brevity, the present invention is described with respect to one exemplary application for Issuers and Acquirers. The Issuer is asked to provide the S/E number, cardmember number and TID (transaction identifier which consists of an unique alphanumeric sequence) (step 305). The program identifies whether a TID was entered by the Issuer (step 310) and if not, the program will automatically assign the TID from a stored algorithm (step 315). The Issuer is next presented with an option which is monitored by the program (step 325). At this point, the Issuer may choose "cancel," which deletes the entries, cancels the current process (step 320) and returns the application to the previous screen (step 230).

Should the Issuer choose "continue", the program begins processing the entered data which includes, but not limited to, deriving both the BIN (bank identification number) from the entered cardmember number and the AIN (acquirer identification number) by matching the S/E number with a table stored on the server database (step 330). The program causes a display of "Retrieval Request Form" (step 332) and displays the previously entered data (step 335). The Issuer is asked to provide additional information about the card and S/E which can include, card expiration date, S/E's name, city and country, and the merchant category code (step 340). The merchant category code classifies the type of business product or service associated with the transaction. In an exemplary embodiment, the program may suitably offer a menu of merchant category codes to be selected by the Issuer.

To facilitate data entry, a plurality of menu options, such as, for example, a "drop-down menu," are stored on the server. The Issuer can choose to have the menu options displayed by "clicking" the appropriate on-screen button. For instance, the Issuer can choose from a "drop-down menu" containing a list of retrieval reason codes (step 345). The drop-down menu offers the Issuer with a list of pre-written options from which the Issuer can simply "click-on" one of the options. This saves the Issuer entry time and further promotes fast and uniform data entry. Examples of retrieval reason codes which may display, include "the cardmember does not recognize this transaction" or "the cardmember requests a copy of the transaction for his personal records." Each retrieval reason code may, be suitably associated with process timeframes.

A similar drop-down menu prompts the user to choose from a list of chargeback reason codes (step 350). "Chargeback" is the term used in the industry to indicate a reversal of a credit transaction which is charged-back to the Acquirer. Chargebacks and chargeback codes may include "goods and services not received," "missing or invalid signature," and "currency discrepancy." The chargeback codes may be associated with process timeframes and indexed by the program (similar to the retrieval reason codes). Additionally, a drop-down menu option prompts the Issuer to choose from a list of supporting documentation codes (step 355). The Issuer may desire a copy of a receipt of the cardmember's purchase, or the credit transaction data containing the details of the transaction carried out at the S/E.

Next, the program prompts the Issuer for entry of the transaction date, the network processing date of the transaction (NPD) and the transaction monetary amount (step 360). The Issuer can choose from a drop-down menu containing a list of currency codes (step 365). The currency code denotes the country of origin for the original transaction. The Issuer is also asked to enter the ARN (acquirer reference number) and any comments the Issuer may wish to include with the retrieval request form (step 370).

After the Issuer enters the appropriate data requested above, the program monitors the next option selected by the user (step 375). If the Issuer wants to cancel the current process, the Issuer chooses the "cancel" option and the application cancels the entries (step 380) and returns to the previous screen (step 300). Once satisfied with the entries, the Issuer chooses the "send" option. The program then verifies that all requested fields are complete (step 385). If field items are missing and/or contain invalid data (e.g., numeric data where alpha data is used), the program causes an error message display (step 390). If all fields are complete, the program announces "Retrieval Request Completed Successfully" (step 395) and transmits the completed form to the server for processing (step 396).

Inbox

As detailed earlier, the displayed "Form Selection" screen depends upon the User ID and password which are entered. Each user may be presented with only those functions which the user is authorized to use. From the "Form Selection" screen, users (e.g., Issuers and Acquirers) are also presented with an "Inbox" function. The inbox displays all the forms routed by the server to the user from other users wishing to initiate or respond to a dispute. For instance, the retrieval request detailed above may be routed by the server to the Acquirer's inbox which corresponds to the AIN entered by the Issuer. The program displays the data entered by the Issuer which will help the Acquirer to identify the particular dispute. In particular, the program causes the display of the TID, NPD, number of supporting documents attached to the form, the Issuer in dispute who completed the form and the type of form. The data in the inbox is made available for viewing and/or downloading by the Acquirer. Supporting documentation may be viewed by downloading from the application to the terminal's local hard drive or network (LAN). The Acquirer is not required to complete fields on the viewed form, but is simply alerted to the request for documentation (e.g., receipt copies) from the party in dispute. The Acquirer may then return to the "Form Selection" screen and choose a form to complete in response to the inbox request.

Fulfillment

Figure 4:
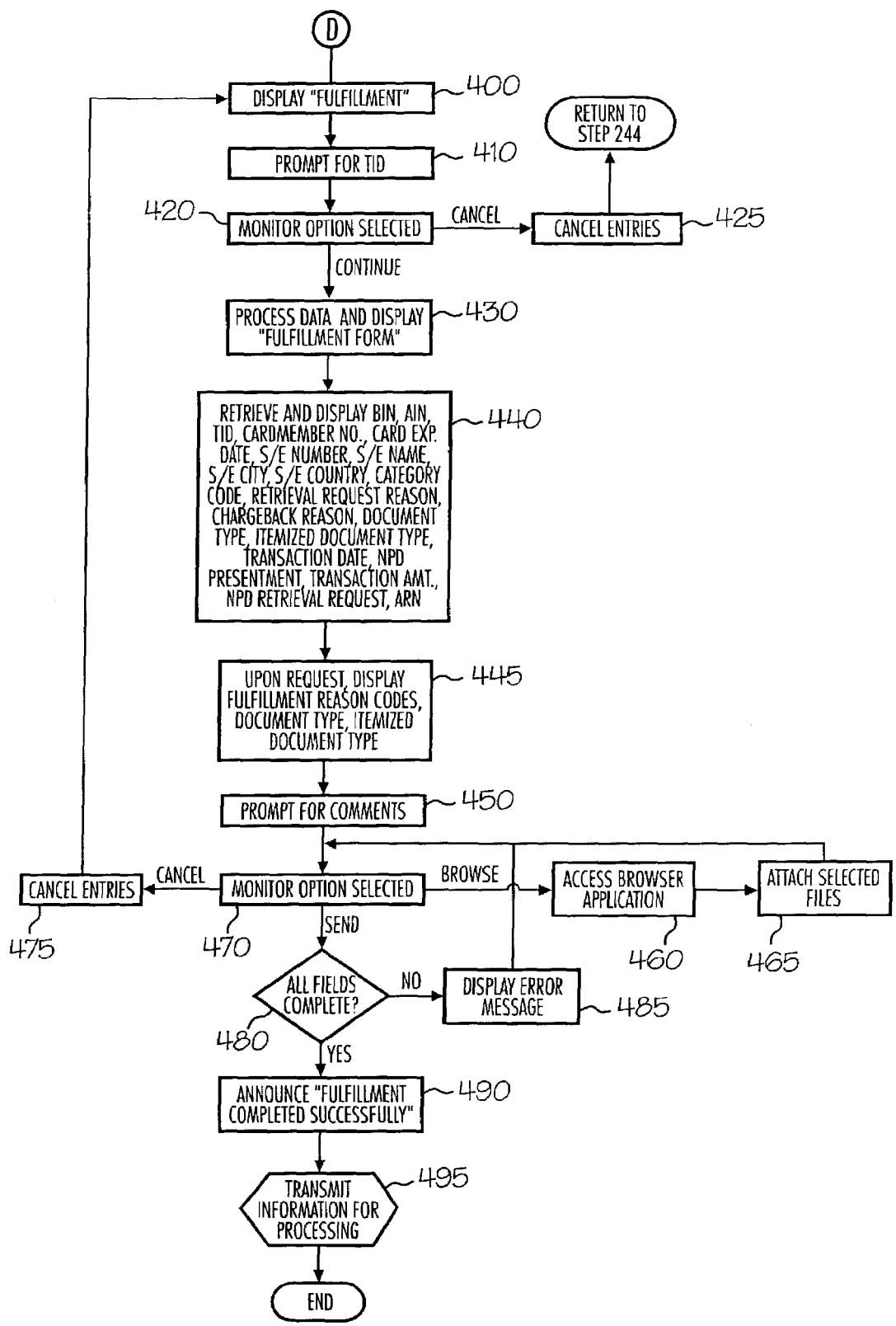
FIG. 4 is a continuation of FIG. 2 illustrating a "Fulfillment" embodiment of the present invention.

Referring now to FIG. 4, in response to the Issuer's retrieval request, the Acquirer may choose the "Fulfillment" option from the "Acquirer Form Selection" screen display. In general, the fulfillment form is a means for the Acquirer to provide the requested information or documentation back to the Issuer. The program causes the display of "Fulfillment" (step 400) and prompts the Acquirer to input the TID (step 410). The Acquirer has the option to continue or cancel the entry, which is monitored by the program (step 420). The Acquirer may choose the "cancel" option and the program will cancel the current process (step 425) and return the application to the previous screen (step 244).

Should the Acquirer choose "continue," the program will begin processing the entered data and cause the display "Fulfillment Form" (step 430). To assist the Acquirer in completing the form, the program displays the data previously entered by the Issuer. The program retrieves data from the previous form (retrieval request) and automatically populates any displayed fields on the fulfillment form which are identical to the data entered by the Issuer (e.g., cardmember number, S/E data, reason codes) (step 440). The program prompts the Acquirer to choose from a drop-down menu containing a list of fulfillment reason codes (step 445) which includes codes for "supporting documentation to follow" and "credit previously issued." The program may also accept any comments from the Acquirer (step 450).

The program monitors the next option selected by the Acquirer (step 470). For example, the Acquirer can choose "cancel" and the application cancels the entries (step 475) and returns to the previous screen (step 400).

In response to the Issuer's request, the Acquirer may need to supply supporting documentation. Referring back to FIG. 1, terminal 140 is suitably coupled to a document scanning device 180. The end-user may operate scanning device 180 to transform any supporting documentation into computer readable format. Typically, the scanned image will be transformed into a JPEG (joint photographic experts group) image file or .jpg file and stored on the user's local hard drive or network.

If the Acquirer has properly scanned documentation in support of the request, the Acquirer selects the "browse" option to review the stored image files. The program is suitably configured to launch access to a stored application such as, for example, WINDOWS EXPLORER® (step 460). If the Acquirer wishes to attach supporting scanned documentation, or any other type of documentation (e.g., word processing document) to the fulfillment form, the Acquirer selects the desired files from the local hard drive or network and the application causes the selected files to attach to the form (step 465).

Once satisfied with the entries, the Acquirer chooses the "send" option. The program verifies that all requested fields are complete (step 480) and if items are missing and/or invalid, the program causes an error message display (step 485). If complete/valid, the program announces "Fulfillment Completed Successfully" (step 490) and transmits the completed form within the server for processing (step 495).

Similar to the Inbox description above, the completed fulfillment form is routed back to the Issuer's access terminal for viewing and/or downloading. The program causes substantially the same display fields for the Issuer as for the Acquirer on the inbox screen. The Issuer may download and view any supporting documentation which the Acquirer has attached to the form.

First Chargeback

Figure 5:
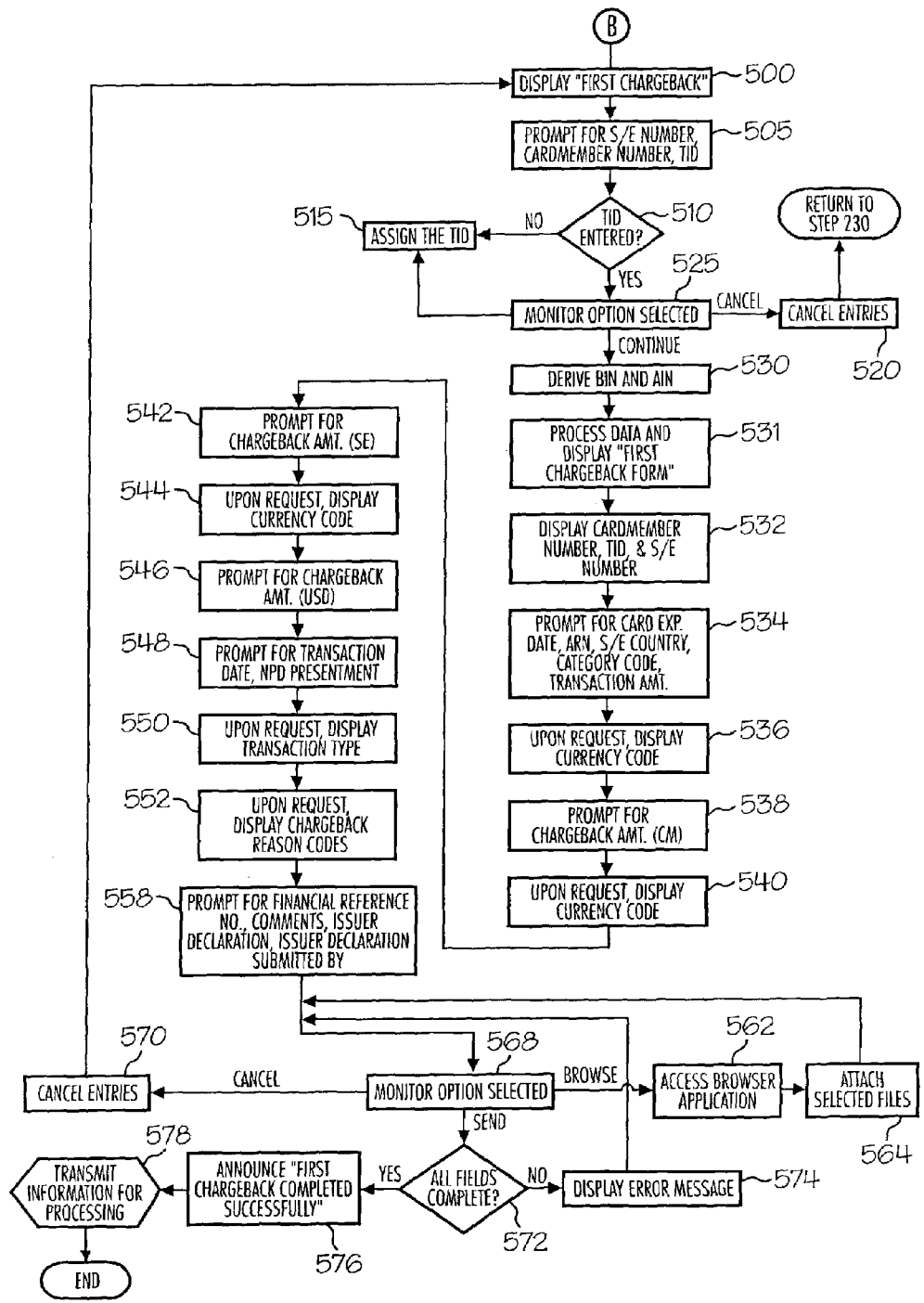
FIG. 5 is a continuation of FIG. 2 illustrating a "First Chargeback" embodiment of the present invention.

Another option available to the Issuer from the "Issuer Form Selection" display (step 230), is to choose "First Chargeback." The chargeback form will alert the Acquirer and subsequent financial personnel that the Issuer is requesting that the funds liability be transferred or "charged back" to the Acquirer. Referring to FIG. 5, once selected, the program causes a display of "First Chargeback" (step 500). (Steps 505-532 are substantially similar to steps 305-335 of the retrieval request FIG. 3.) The Issuer is asked for the S/E number, cardmember number and TID (step 505). The program identifies whether a TID was entered (step 510) and automatically assigns the TID from a stored algorithm (step 515) if entry is missing. The program monitors the next option selected by the Issuer (step 525). The Issuer, as previously disclosed, can cancel the entries (step 520) and return the application to the previous screen (step 230).

Should the Issuer choose "continue," the program begins processing the entered data such as, for example, deriving both the BIN and AIN (step 530) in substantially the same manner as previously disclosed. The program causes a display "First Chargeback Form" (step 531). To assist the Issuer in completing the form, the program automatically retrieves from the previous forms (e.g., retrieval request, fulfillment) identical data and populates the identical field entries that were entered by the previous end-user (either the Acquirer or the Issuer) (step 532). The Issuer is asked to enter the card expiration date, ARN, the S/E's name, city and country, the category code and the transaction amount (step 534). The program may suitably offer a drop-down menu containing a list of merchant category codes for the Issuer to choose from.

In the following steps, 536, 540, 544, 550 and 552, the program causes a display from a drop-down menu option for the Issuer to choose from. A drop-down menu button follows the monetary amounts the Issuer is requesting to chargeback to the Acquirer (step 534) (step 538) (step 542). The menu displays a list of currency codes for the Issuer to "click on" for each amount entered (step 536) (step 540) (step 544). Based upon the chargeback amount entered (step 538), the program performs a series of mathematical calculations for internal accounting purposes. These calculations are not displayed to the user. Another menu option prompts the Issuer to choose a transaction type (e.g., charge or credit) (step 550). The Issuer is also asked to provide a chargeback reason code from another drop-down menu (step 552). As previously disclosed, the chargeback reason codes may be associated with process timeframes and indexed as such by the program.

The program prompts the Issuer to provide information with respect to the chargeback which will help the Acquirer to identify the transaction, such as, for example, monetary chargeback amounts (step 546), the transaction date (step 548), NPD presentment, a financial reference number and any comments the Issuer may wish to include with the first chargeback form (step 558).

Based upon the chargeback reason code entered by Issuer, the Issuer may be asked to enter an Issuer declaration and the name of the person submitting the declaration (step 558). An Issuer declaration is a certification by the Issuer that any requisite conditions under the chargeback code has been met. Each code may have specific conditions which the Issuer meets in order to properly use the code, for example, "that the card had been cancelled prior to the date of the chargeback," "provide the cardmember's cancellation confirmation number," or "provide the duplicate billing number." The program may index the dispute by the chargeback code entered by the Issuer.

The program monitors the next option selected by the Issuer (step 568). If the Issuer cancels the current process, the program deletes the entries (step 570) and returns to the previous screen (step 500). As previously discussed, the Issuer may wish to attach supporting documentation to the first chargeback form. The Issuer selects the "browse" option, reviews the files stored on the local hard drive or network, then selects the desired file(s). If the "browse" option is selected, the program is suitably configured to access an application, such as WINDOWS EXPLORER®, stored on the local hard drive or network (step 562). Upon selection of the desired file(s), the program causes the selected file(s) to attach to the form (step 564).

Once satisfied with the entries, the Issuer chooses the "send" option. The program verifies that all requested fields are complete (step 572) and if items are missing, the program causes an error message display (step 574). If no error message is displayed, the program announces "First Chargeback Completed Successfully" (step 576) and transmits the completed form within the server for processing (step 578).

The program is configured to route the dispute-related data entered by the Issuer on the first chargeback form to the Acquirer in dispute. During processing, (step 578) information is extracted from the form which aids the program in determining where to route the form. The Acquirer is alerted to the presence of the routed form with a display on the Acquirer's inbox screen.

Second Presentment

Figure 6:
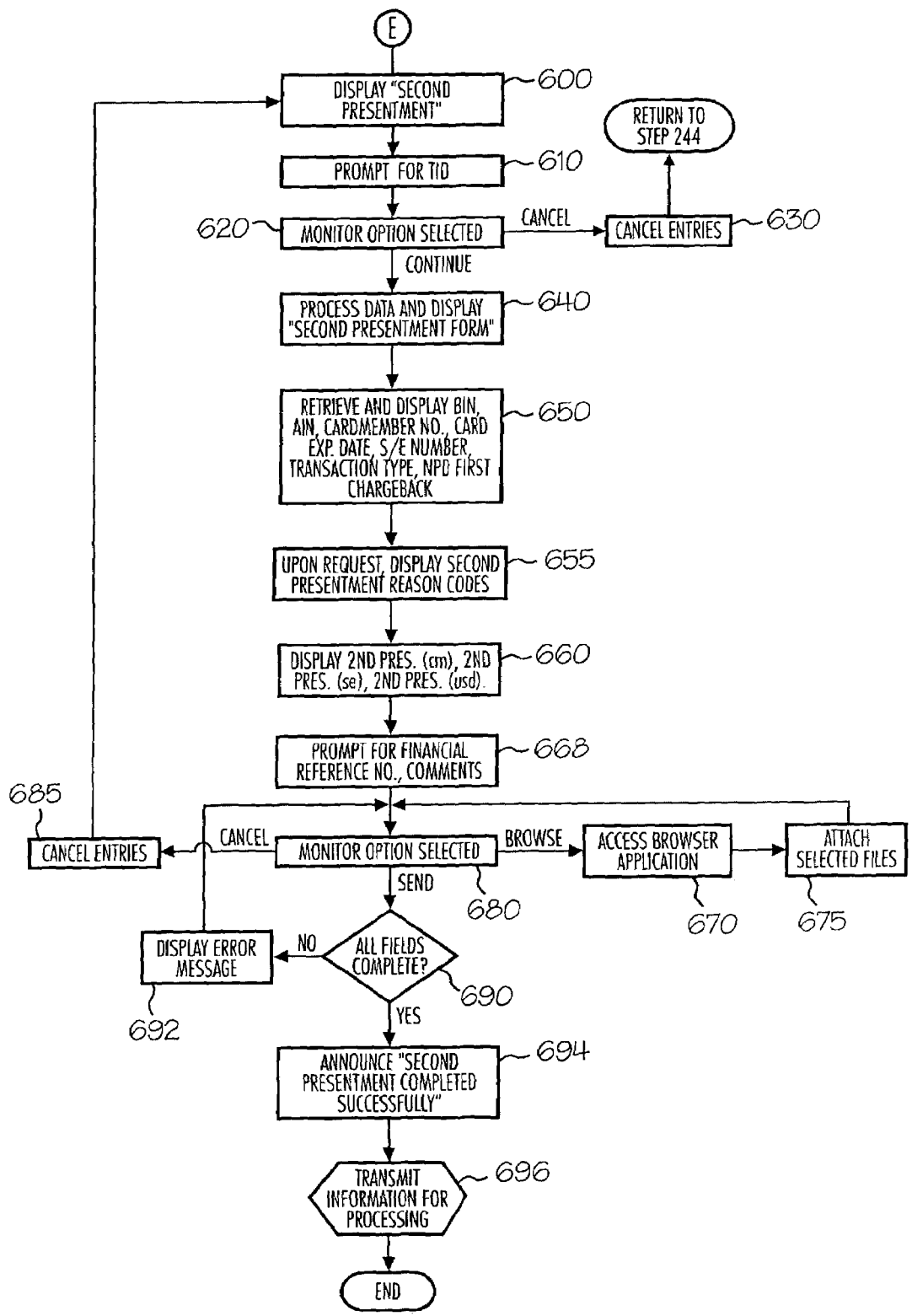
FIG. 6 is a continuation of FIG. 2 illustrating a "Second Presentment" embodiment of the present invention.

Typically, the Issuer completes the first chargeback form which is routed by the program on the server to the corresponding Acquirer. The Acquirer may refute the chargeback and present the transaction back to the Issuer. To present back, the Acquirer selects a "second presentment" option from the "Acquirer Form Selection" display (step 244). By presenting back or second presentment, the Acquirer is requesting that the funds liability be transferred back to the Issuer. Referring to FIG. 6, the program causes a display of "Second Presentment" (step 600) and prompts the user to input the TID (step 610). The next option selected by the Acquirer is monitored (step 620). The Acquirer may wish to cancel the entries by choosing "cancel," which causes the program to cancel the current process (step 630) and return the application to the previous screen (step 244).

Should the Acquirer choose "continue," the program begins processing the entered data and causes a display "Second Presentment Form" (step 640). The program retrieves data from a previous form and automatically populates the fields identical to the data entered by the Issuer on the first chargeback form (step 650). The program prompts the Acquirer to "click" a drop-down menu and select from a list of second presentment reason codes (step 655). The second presentment dollar amounts are displayed but may be changed by the Acquirer if they are incorrect or a different amount is desired (step 660). Based upon the second presentment (SE) dollar amount, the program performs a series of calculations for internal accounting purposes. The Acquirer then inputs the financial reference number and any comments the Acquirer may wish to include with the second presentment form (step 668).

The program monitors the Acquirer's next selection (step 680). (Steps 670-696 are substantially similar to steps 460-

495 of the fulfillment form FIG. 4.) As previously disclosed, the Acquirer can "cancel," "browse" or "send" the form for processing. If the "cancel" option is chosen, the program cancels the entries (step 685) and returns to the previous screen (step 600). After the "send" option is chosen and all fields are complete, the program announces "Second Presentment Completed Successfully" (step 694) and transmits the completed form within the server for processing (step 696).

Final Chargeback

Figure 7:
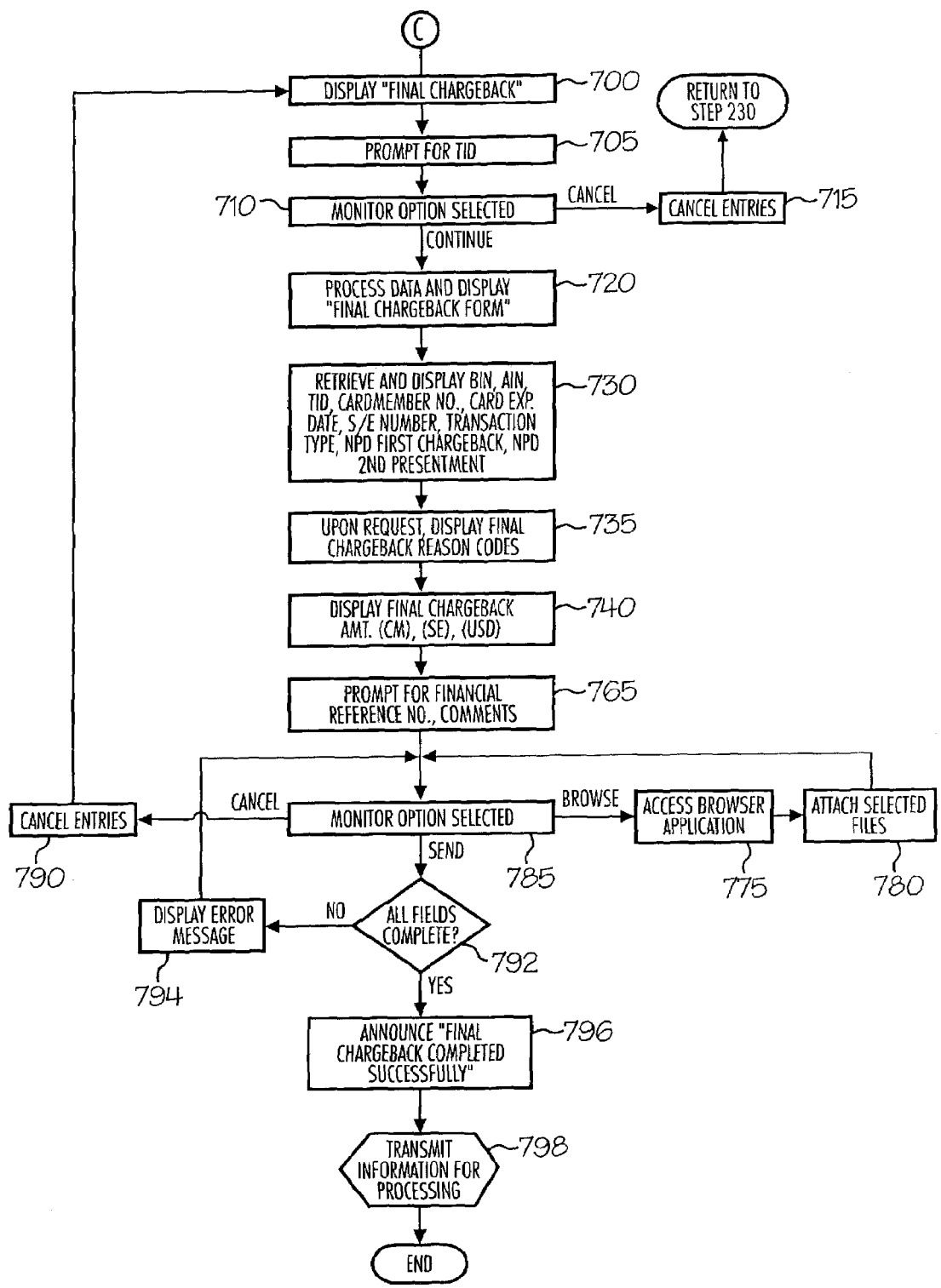
FIG. 7. is a continuation of FIG. 2 illustrating a "Final Chargeback" embodiment of the present invention.

Upon receipt and review of the second presentment form (as disclosed previously, the Issuer is notified of the form through the "inbox" function), the Issuer may decide to complete a "final chargeback" which is chosen from the "Issuer Form Selection" display (step 230). With reference to FIG. 7, the program causes the display of "Final Chargeback" (step 700) and prompts the user to input the TID (step 705). The next option selected by the Issuer is monitored (step 710). The Issuer can choose "cancel" or "continue" in a similar manner as previously disclosed (refer to first chargeback FIG. 5).

The "continue" option begins the processing of the entered data and causes a display of "Final Chargeback Form" (step 720). The application retrieves and automatically populates the fields identical to the data entered by the Issuer on the first chargeback form or by the Acquirer on the second presentment form (step 730) (step 740). The program performs mathematical calculations on the final chargeback amount (step 740) for internal accounting purposes. The program prompts the Issuer to choose from a list of final chargeback reason codes from a drop-down menu (step 735). The final chargeback reason codes may be the same or substantially similar to the first chargeback reason codes previously discussed. The program prompts the Issuer to input the financial reference number and any comments the Issuer may wish to include with the final chargeback form (step 765).

The program monitors the Issuer's next selection (step 785). (Steps 785-798 are substantially similar to steps 568-578 of the first chargeback form FIG. 5.) As previously disclosed, the Issuer can "cancel," "browse" or "send" the form for processing. If the "cancel" option is chosen, the application cancels the entries (step 790) and returns to the previous screen (step 700). After the "send" option is chosen and all fields are complete (step 792), the program announces "Final Chargeback Completed Successfully" (step 796) and transmits the completed form within the server for processing (step 798).

Administrative Operations

As previously disclosed, the present invention is conveniently described with reference to a transactional dispute between an Issuer and an Acquirer, however, one skilled in the art will recognize that the scope of the present invention can include other end-users, such as, for example, administrative and financial personnel.

Typically, Issuers and Acquirers request a User ID from an administrative operations center or similar centralized management. In an effort to maintain uniformity and control, generally only administrative personnel review, approve and issue the User ID and password. Each User ID and password are unique to each specific user and based upon the User ID and password, the program is configured to display only those forms or functions available to the user (e.g., Issuers may be presented with only Issuer forms and Acquirers may be presented with only Acquirer forms).

In one exemplary embodiment, administrative personnel (AP) access the program stored on the server to perform one of two functions, dispute handling or administrative. Unlike the other types of users, the AP may be able to access the forms and functions of other users. The dispute handling option (FIG. 2) allows the AP to choose from either the Issuer or Acquirer forms and complete a form on behalf and at the direction of a specific Issuer or Acquirer, thereby allowing the AP to initiate or respond to a credit dispute.

Figure 8:
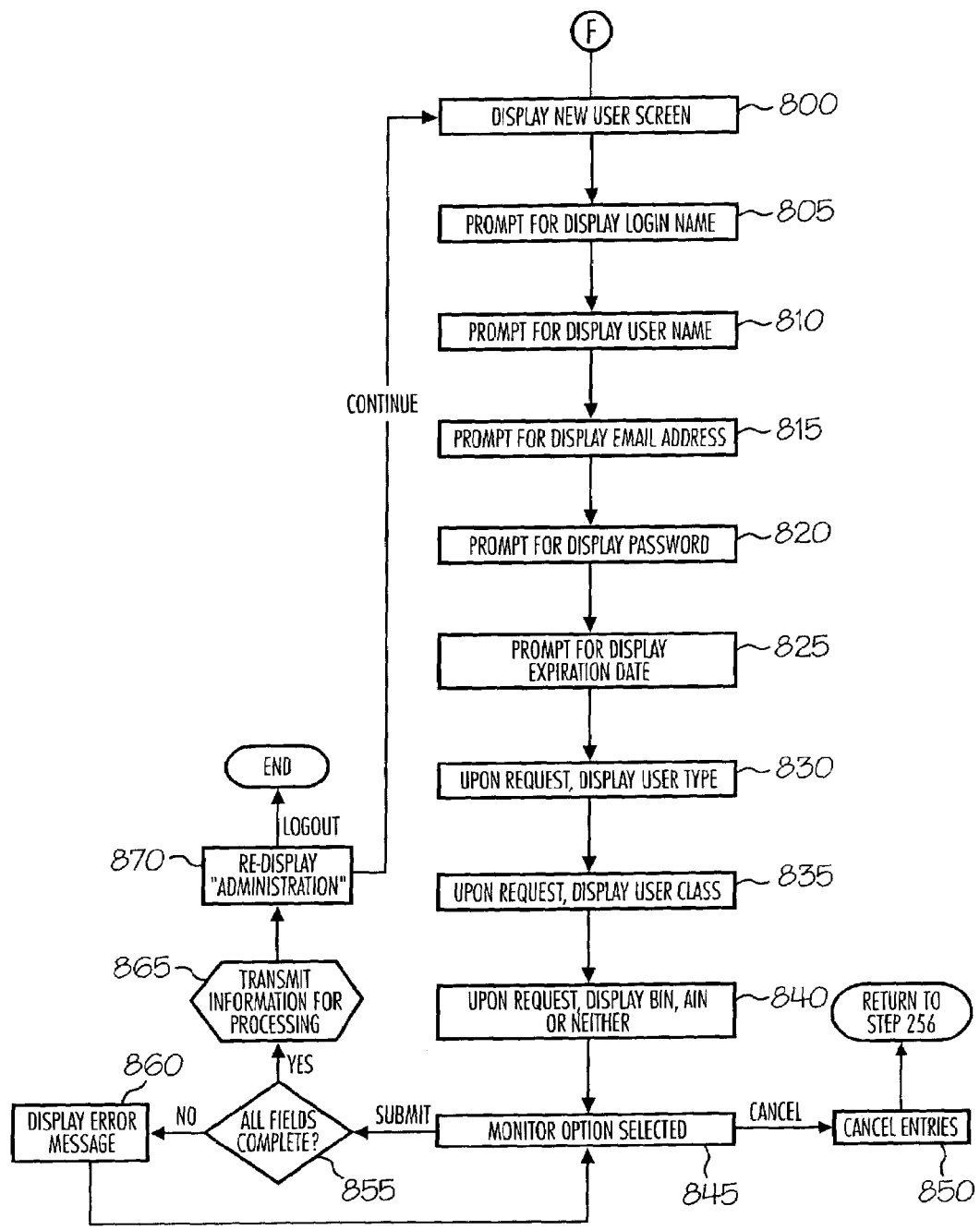
FIG. 8 is a continuation of FIG. 2 illustrating a new user embodiment of the present invention.

A second option which may be available to the AP includes performing User ID functions such as adding, deleting or modifying a User ID or access. Referring to FIG. 8, once the AP receives a request for a User ID and password, the AP can add the user, by choosing the "Add" option from the "Administration" screen. The program causes the new user screen to display (step 800) and prompts for information with respect to the new user. For instance, the AP is asked to provide the login name (step 805), user name (step 810), email address (step 815), password (step 820) and expiration date of the User ID (to be determined by AP) (step 825). Further information such as the user class and type (e.g., Issuer, Acquirer, AP, FP) (step 830)(step 835), and the BIN, AIN or neither (step 840) is also provided. The BIN may be needed if the new user is an Issuer, the AIN may be needed for an Acquirer, and neither number may be provided if the new user is an AP or a FP.

The program monitors the next option selected by AP (step 845). For example, the AP can choose "cancel" and the application cancels the entries (step 850) and returns to the "Administration" screen (step 256). The AP can "submit" the form, at which point the program verifies that all requested fields are complete (step 855) and if items are missing, the program causes an error message display (step 860). If complete, the program closes the current screen and transmits the information within the server for processing, which may include storage on the server database (step 865). The program redisplays the "Administration" screen (step 870) and prompts the AP to "continue" which allows the AP to add another user (step 805) or "logout" which ends the function.

Figure 9:
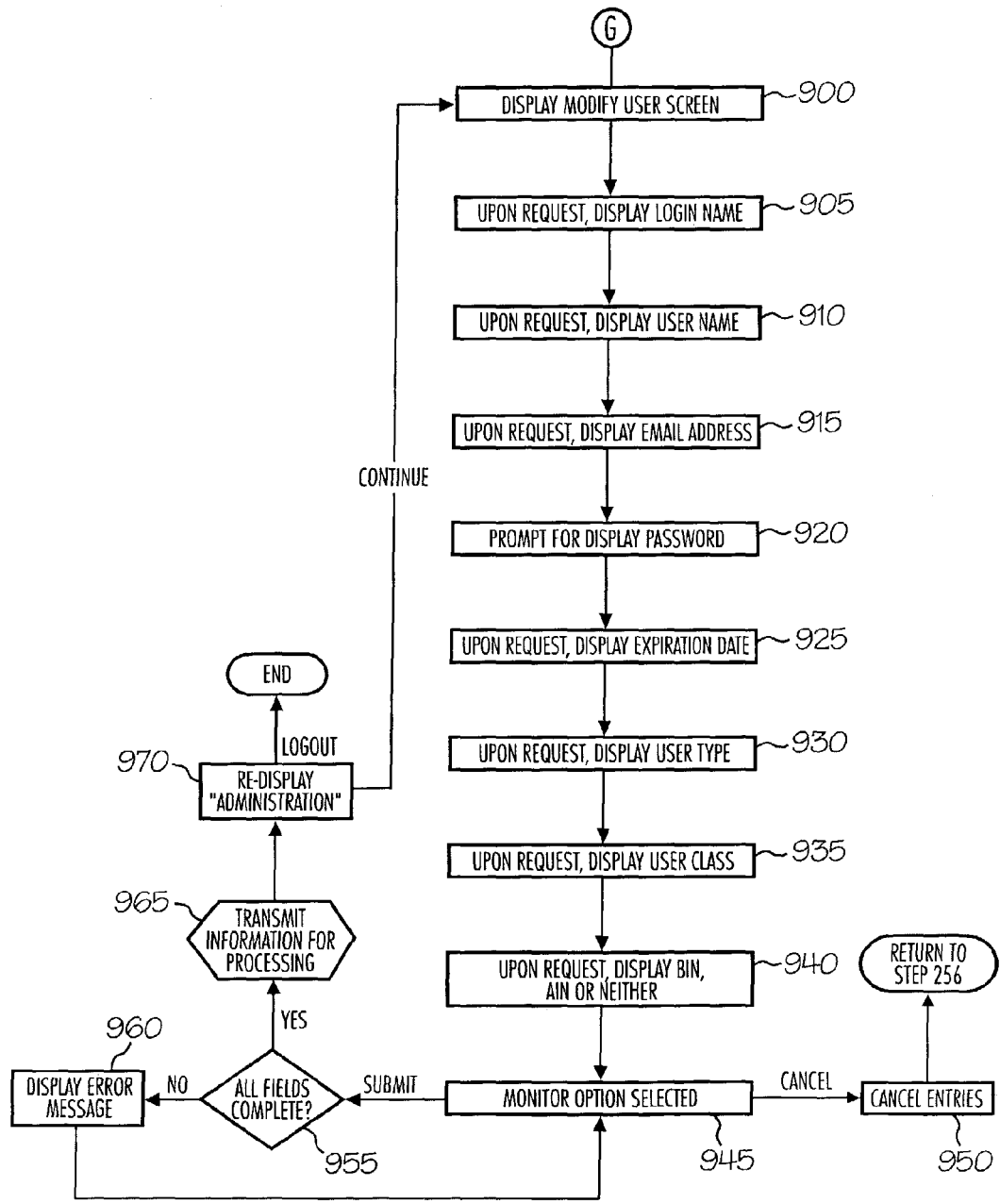
FIG. 9 is a continuation of FIG. 2 illustrating a modify user embodiment of the present invention.

With reference to FIG. 9, the AP can modify a user that already has a User ID and password. It may be necessary to change a user's type (e.g., from Issuer to Acquirer) or modify the User ID and password in any similar manner. Upon selection of "Admin," the program causes the "Administration" screen to display along with a list of all active and inactive users that have been assigned a User ID and password. The user list is retrieved from the database located on the server. The AP identifies a user from the list as the user to modify and "highlights" the user. Next, the AP chooses "Modify" from the "Administration" screen which causes the program to display the modify user screen (step 900). The AP is asked to provide information about the highlighted user (steps 905-940 are substantially similar to steps 805-840) and the AP can change the current status or data for the user at this time. The remaining program steps, 945-970, are substantially similar to steps 845-870 disclosed above for adding a new user. The modified user data can suitably be stored on the server database.

Figure 10:
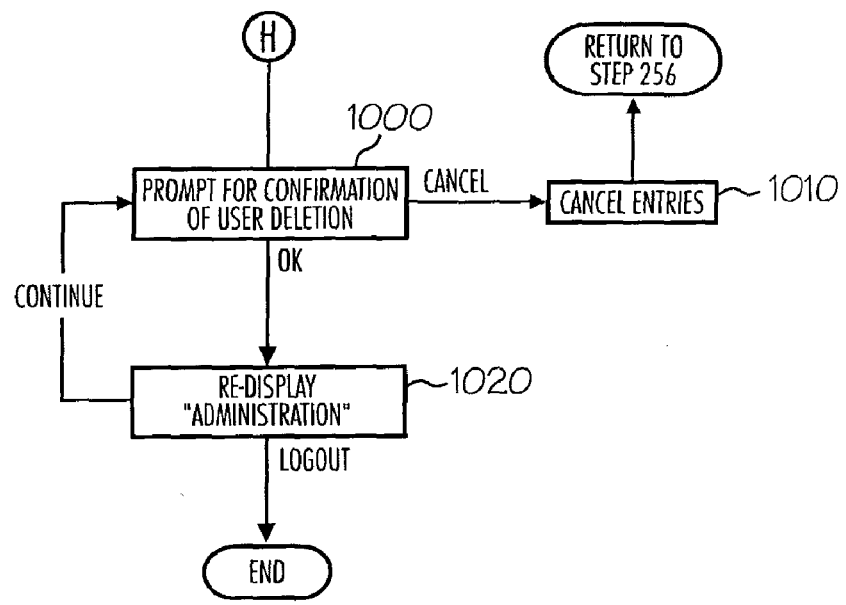
FIG. 10 is a continuation of FIG. 2 illustrating a delete user embodiment of the present invention.

Finally, as a third option in an exemplary embodiment, the AP may delete a user as illustrated in FIG. 10. From the "Administration" screen, the AP highlights the user to delete from the displayed list, then chooses "delete." The program prompts the AP for a confirmation of user deletion (step 1000), in other words, the program requests that the AP choose "cancel" (step 1010) (to cancel the entry and start over) or "ok" to delete the user from the list. Once deleted, the User ID may no longer be granted access to the web site located on the server, however, the user may remain on the list as an inactive user. The program redisplays the "Administration" screen (step 1020) which gives the AP the opportunity to "continue" and delete another user (step 1000) or "logout" and end the function.

In an exemplary embodiment, from the "Administration" screen, the AP can write a text message to appear on the home page of other types of users including other AP. Typically, a message may include daily announcements, system failures or the like.

Financial Operations

Financial personnel (FP) perform settlement and funds exchange between the Issuers and Acquirers. In practice, an Issuer receives a complaint from a cardmember regarding a transaction which typically involves a monetary amount. The Issuer disputes the amount with the Acquirer by completing one or more on-line forms as previously disclosed. In one embodiment each form which can transfer liability from an Issuer to an Acquirer (e.g., first and final chargeback) or vice versa (e.g., second presentment) can be logged on a reporting system. The FP accesses the web site stored on the server and views the reports on a timely basis to reconcile or redistribute funds accordingly.

In an exemplary embodiment, the FP accesses the web site stored on the server and chooses "Reports" option from the home page (FIG. 2). There may be any number of reports available for the FP to view, but in the sake of brevity, only three will discussed herein. One report may list all the first and final chargeback forms completed for the day. The FP can view or download the report and transfer the liability from the Issuer listed to the Acquirer listed on the form. A second report may list all the second presentments for the day. Again, the FP can view the second presentment report and transfer the liability from the Acquirer listed to the Issuer listed on the form.

A third report may list all the transactions that were sent to wrong Acquirer's inbox for the day. On occasion, a form completed by an Issuer may be misrouted by the server, or a wrong AIN may be entered by the Issuer, resulting in the form being sent to the wrong Acquirer. The Acquirer can reject the form request from the Issuer and transmit the original form back to the web site/server and subsequent AP for rerouting. The FP may have already transferred liability to the Acquirer prior to the Acquirer or anyone else realizing the misrouting error. In this case, the FP transfers the liability back to the original Issuer once the report, indicating the misrouting has been generated.

Documents Only

Users, (e.g., Issuers and Acquirers) may complete or begin a dispute handling process using another method not disclosed by the present invention, such as for example, on an internal network or infrastructure. However, many internal networks or infrastructures have inadequate methods for transfer of supporting documentation or alternatively, no file transfer capabilities at all. This presents a problem for the Issuers and Acquirers using an infrastructure who desire to transmit documentation in support of a pending dispute.

To overcome the file transfer problem associated with initiating or responding to a dispute on an internal network or infrastructure, Issuers and Acquirers can transmit documentation in support of a dispute process originating on an infrastructure with the speed and efficiency of the Internet. The present invention, as previously disclosed, provides users, such as Issuers and Acquirers, a system and method for real-time transfer of supporting documentation with respect to a transactional credit dispute.

Users (Issuers and Acquirers) may choose a "Documents Only" form from the "Form Selection" display. The "documents only" form is a supporting documentation exchange between users in dispute. In one embodiment, documentation such as ROC, hotel folio, and any additional duplicate transaction record which may facilitate the dispute process can be scanned, stored and retrieved in a similar manner as previously disclosed (see the discussion under FULFILLMENT). Scanned documentation may then be exchanged between the Issuer and the Acquirer using the "documents only" form.

Whether the user, for example an Issuer, completes a "documents only" form or one of the previously disclosed forms (e.g., first and final chargeback) all desired information will be supplied by either the Issuer on the "documents only" form or automatically retrieved by the program from a previous entry by the Issuer. For example, the Issuer may begin the dispute process over an internal infrastructure, which is not embodied by the present invention. The Issuer may be asked to provide similar information as disclosed in the "retrieval request," "first chargeback" and "final chargeback" forms (except for the "browse" option to attach supporting documentation) which is then stored on the infrastructure's database. The Issuer can then use the previously disclosed system and method to transmit any supporting documentation. The server, as previously disclosed, having a database, is configured to link to the infrastructure's database and search the infrastructure's database to find the Issuer's previous entry which initialized the dispute in question. The server then retrieves the previously entered data for the dispute.

Figure 11:
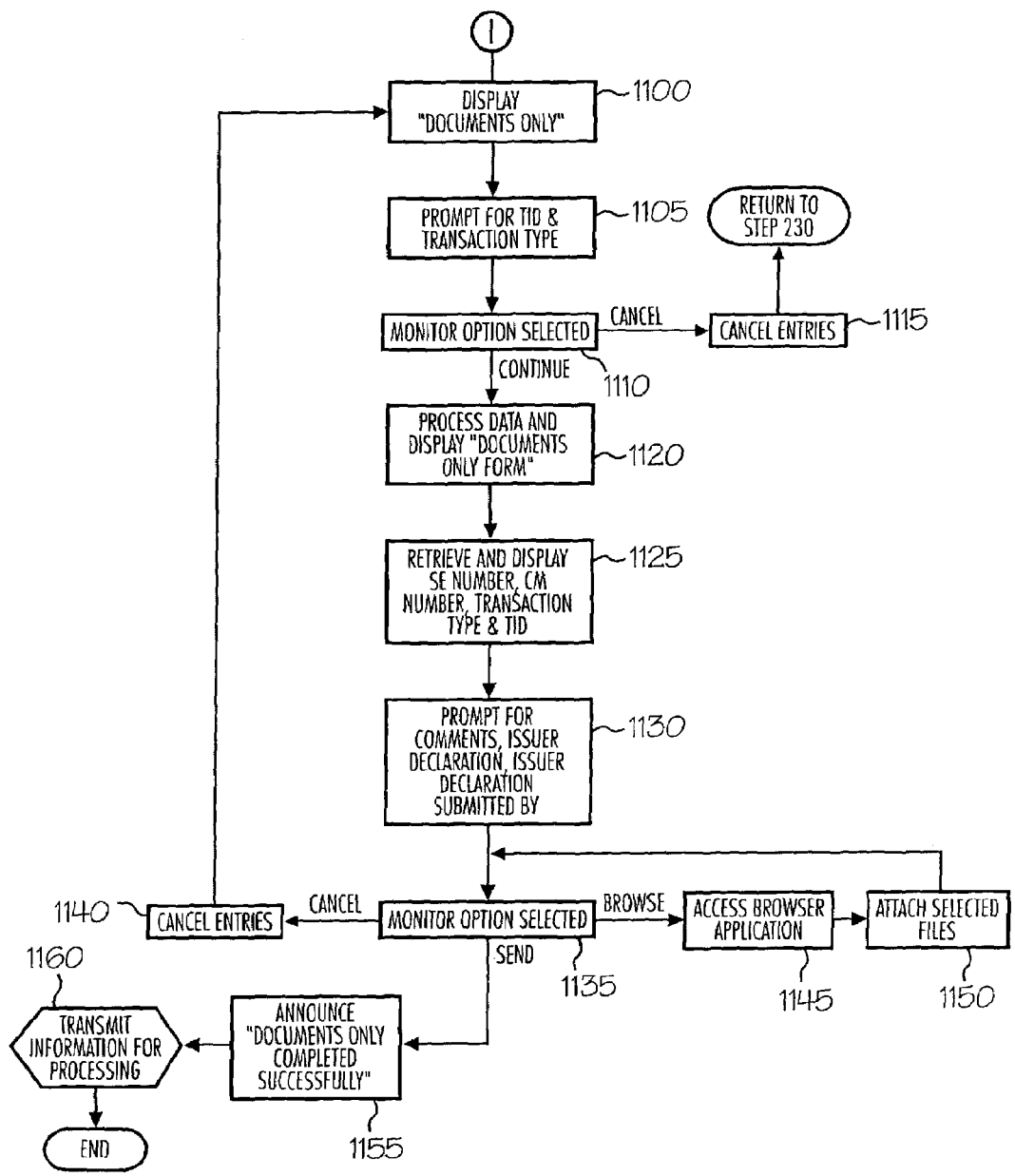
FIG. 11 is a continuation of FIG. 2 illustrating a "Documents Only" embodiment of the present invention.

With reference to FIG. 11, the "documents only" form and function will become clearer. After the Issuer has initiated a dispute on the infrastructure, or similar internal network, the Issuer may want to include supporting documentation. The Issuer can access the disclosed web site and choose "Documents Only" from the "Issuer Form Selection" display (step 230) (See, FIG. 2). Once selected, the program causes the display "Documents Only" (step 1100) and the Issuer is asked to provide the TID and transaction type, which may include first or final chargeback (step 1105). The program monitors the "continue" and "cancel" options (step 1110). If the Issuers wants to cancel the entries (step 1115)) and start over or quit the program, the "cancel" option is chosen and the program returns to the previous screen (step 230).

If the Issuer chooses "continue," the program begins processing the entered data and causes the display "Documents Only Form" (step 1120). The processing step includes, but is not limited to, matching the entered TID with a previously entered TID stored on the server 100 database corresponding to the initial entry made by the Issuer. To assist the Issuer in completing the "documents only" form, the program displays information retrieved from the infrastructure's database pertaining to the dispute in question (step 1125)).

Based upon the chargeback reason code entered by the Issuer on infrastructure, the Issuer may be asked to enter an Issuer declaration and the name of the person submitting the declaration (step 1130) in a substantially similar manner as previously disclosed (see step 558). The program may index the dispute by the chargeback reason code entered by the Issuer.

The program monitors the next option selected by the Issuer (step 1135). If the Issuer "cancels" the current process (step 1140), the program deletes the entries and returns to the previous screen (step 1100). As discussed, the Issuer chooses the "documents only" to supplement a previously entered transaction on, for example, an infrastructure. The Issuer chooses the "browse" option causing the program to access an application, such as WINDOWS EXPLORER®, stored on the Issuer's local hard drive or network (step 1145). The Issuer views the stored files (see the discussion under FUL-FILLMENT) and selects the desired file(s) to attach (step 1150). Once satisfied with the entries on the form, the Issuer chooses the "send" option. The program announces "Documents Only Completed Successfully" (step 1155) and transmits the completed form within the server for processing (step 1160).

The program is configured to route the dispute-related documentation selected by the Issuer and attached by the program to the Acquirer. The Acquirer is alerted to the presence of the routed form with a display on the Acquirer's inbox screen.

Figure 12:
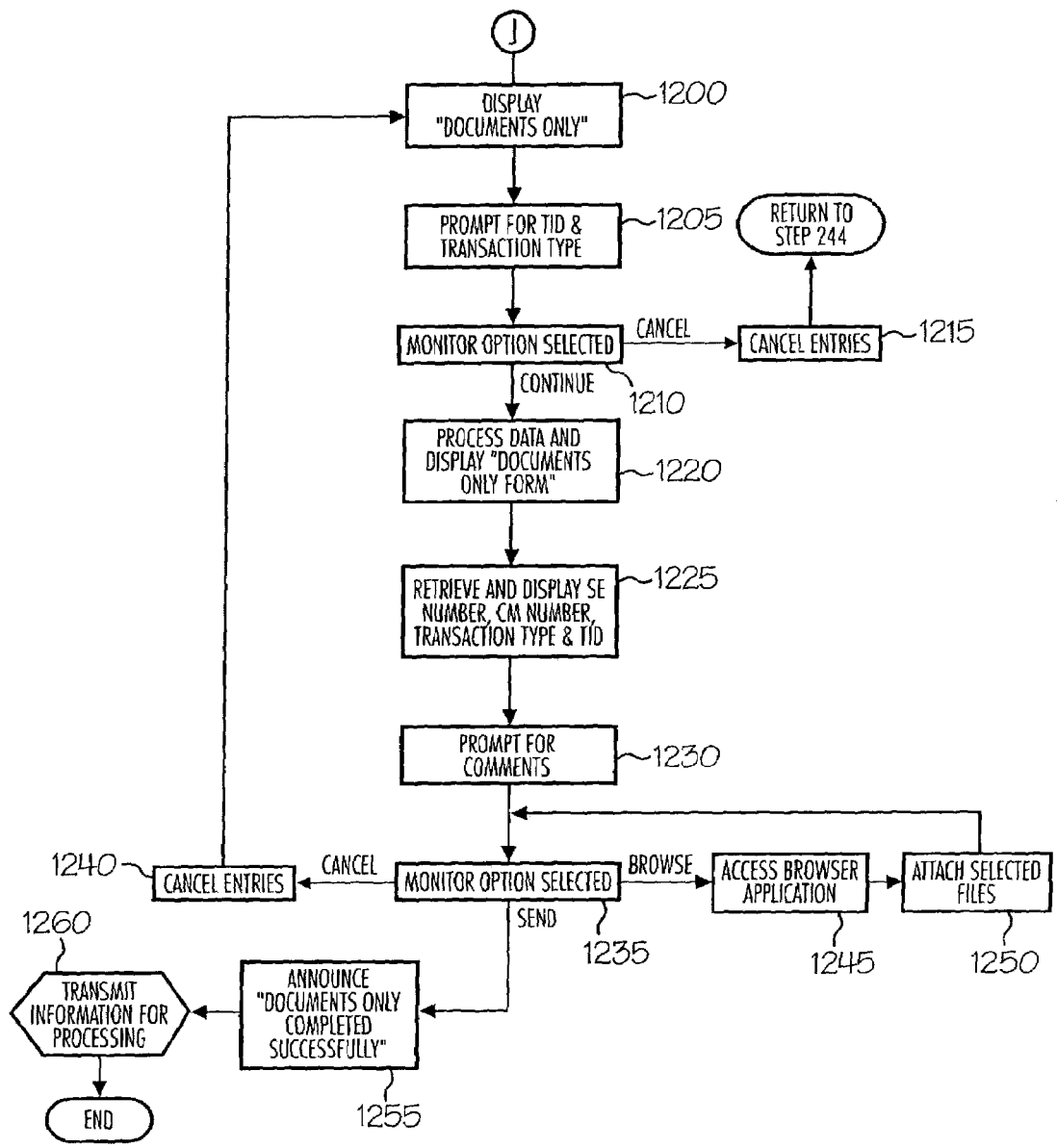
FIG. 12 is a continuation of FIG. 2 illustrating another "Documents Only" embodiment of the present invention.

For substantially the same reasons discussed for the Issuer, the Acquirer may wish to transmit supporting documentation outside the infrastructure using the system and methods of the present invention. Referring to FIGS. 2 and 12, the Acquirer selects the "Documents Only" form from the "Acquirer Form Selection" display (step 244) causing the program to display "Documents Only" (step 1200). The Acquirer is asked to enter the TID and transaction type (e.g., fulfillment and second presentment) (step 1205).

Whether using the "Documents Only" selection or any of the other selections, architectures or environments of the invention, data interchange may be based on as XML (Extensible Markup Language) or a variety of other protocols such as XML, ASN.1, or the interchange protocol may be completely custom designed. The interchange may occur over a variety of network types in addition to TCP/IP.

In one exemplary embodiment, transmission of document and form data outside the infrastructure may use specialized data interchange. Similarly, in alternative embodiments, submission and display of forms data may also use this specialized data interchange. In a particular embodiment, this data interchange may use Extensible Markup Language (XML) that is defined by an XML schema known to and agreed upon by the transmitting parties. XML provides the ability to create well-formed and valid representations of data that may be validated and exchanged between a variety of different systems. The specific interchange format of this data interchange of the present invention may be specified by either an XML Schema or Document Type Definition (DTD). This DTD or Schema identifies the exact data elements of the interchange, plus the grammar rules for when and where these elements may appear in the XML data that is exchanged according to the methods of the invention. An exemplary system of the invention may include software that performs processing of the XML data. For example, the software may perform interconversion of XML data to and from any of the data entry forms, data display forms, document-only transmissions, and infrastructure. XML permits a variety of systems from different vendors to communicate with one another without error. As such, the data interchange should also be resilient with respect to introduction of new data fields, and tolerance of data interchange based on both earlier and later versions of the interchange format. XML is also valuable in representing forms, e.g., dispute-related forms, as well as the data that may originate from those forms (during the process of user data entry). In one possible embodiment, XML can be digitally signed, providing auditability and leading to non-repudiation abilities for the exchange between the four parties (i.e., Issuers, Acquirers, cardmembers and merchants).

In alternative embodiments, transmission of data is by any variety of communication mechanisms, protocols, formats, etc., which include, but are not limited to, remote procedure calls, local procedure calls, message queuing, message oriented middleware, database updates and stored procedures. Any of which might utilize any standard or proprietary technologies such as Java RMI, EDI, COM, DCOM, CORBA, IIOP, IBM MQ Series, MS MQ, etc.

When data is submitted to a host for processing, it may either include or omit the associated form. In both HTML and XML forms, the data elements may be identified by field labels and similar tags that are used variously for identifying data elements and rendering forms on a user interface. When included, the form and form data may be interspersed within the document, or may occur at completely separate locations within the document. Regardless of how the form data is sent to a host, forms may originate from locations that are the same or other than the hosts to which data is transmitted.

The location of the XML Schema, DTD, or other syntax definition (called simply "schema") can vary according to the particular application. The schema may occur within the body of an XML message, or may reside on a specific host. The specific host where the schema resides may be identified by the XML message, or may simply be known by the communicating hosts to reside on a specific host. The host where the schema resides may be any of the communicating hosts in the architecture, or any arbitrary server such as one that is present on the Internet, and which serves as a repository for XML Schema. For example, a standard interchange format may be agreeable to all Acquirers and Issuers and as such, the format of this interchange may be defined by an XML Schema that resides on a central server on the Internet that stores standard XML Schemas used by financial business systems.

Forms and fields are described variously as part of the system and method for dispute handling. The present invention encompasses many variations of how these forms are represented and stored. They may be represented as HTML documents that are submitted to appropriate HTTP servers when the user of the web browser performs certain actions, such as clicking on buttons or depressing the "Enter" key. Forms may also be represented by XML documents that are rendered as HTML forms by software technology that operates on some machine such as a user workstation or web server. This processing may also occur in combination with another document or information such as would be captured in an XML Style Sheet (XSL). In one embodiment, the XML form document is sent from one server to another, then the second server processes the XML form along with an XSL document, and then this second server creates an HTML form in response to this processing, and finally sends this HTML form to the end user workstation. In another embodiment, a server sends an XML form to a workstation, which contains browser software that can read the XML form, download an appropriate XSL document, and then render the contents so that the user can perform data entry on the workstation.

Similar to the schema, the XML form and the XSL style sheet that is used in conjunction with the form can reside in a variety of locations. For example, XML forms may reside on a central server on the Internet that stores standard XML forms used by financial business systems. Alternatively, they could reside on the various hosts described for the architectures of the invention. Similar variation in the location of the form repository applies regardless of the protocol and format of the form document. For example, and HTML form could similarly be stored on a central server or any host of the architecture. Under other variations, the form could be embodied in a simple list of field names and/or data types, a spreadsheet document, as in Microsoft Excel, or a forms document, such as Adobe Acrobat, for example.

Information may be routed between the parties in a variety of manners, for instance, "store and forward" and/or "direct retrieval". In a "direct retrieval" system embodiment, the user or system that is performing an activity initiates the retrieval of information that is needed to perform that activity. The information comprises some combination of forms, data, and documents. For example, in an exemplary embodiment, the system may allow an Issuer to process a list of queued fulfillments. Under direct retrieval, the forms, data, and/or documents that comprise a fulfillment are retrieved by the Issuer. This may involve connecting to a central server or Acquirer server and transferring the data and documents to one or more of the Issuer server, the Issuer workstation, and/or the Issuer infrastructure.

In another example, an Issuer may obtain a form that is to be completed as part of a retrieval request that will be sent to the Acquirer. As explained in the above sections concerning XML and forms variants, the form itself might be an HTML document, XML document, a simple list of fields, a spreadsheet, or an Adobe Acrobat document. Under the direct retrieval variant, the form is retrieved by the Issuer. This may involve connecting to a central server or Acquirer server and transferring the form to one or more of the Issuer host, the Issuer workstation and/or the Issuer infrastructure.

In a "store and forward" system embodiment, the user or system that performs an activity may be automatically provided with information needed to perform that activity. The forms, data, and/or documents are transferred across the network from some server to the machine where the user performs work. For example, an Issuer may process fulfillments, simply by accessing locally stored data and/or documents that comprise the fulfillment. These documents are stored on one or more of the Issuer server, the Issuer workstation and/or the Issuer infrastructure.

In another example, an Issuer accesses a form that is to be completed as part of a retrieval request that will be sent to the Acquirer. This form is already present on the Issuer server, the Issuer workstation, or Issuer infrastructure. It does not need to be retrieved from a central server, Acquirer server, or other machine.

Note that both "direct retrieval" and "store and forward" may use any of a variety of software to perform transfers of files and data, and for the entry and collection of information. The workstation may run any combination of application software including but not limited to a mail client, web browser, and custom software. Email clients may utilize any of a number of email protocols such as POP3, IMAP4, or SMTP. Examples of emails clients are Outlook or Outlook Express by Microsoft Corporation of Redmond, Wash., or Netscape Messenger by Netscape Communications Corporation of Mountain View, Calif., or Eudora by University of Illinois and licensed to Qualcomm, Incorporated. Examples of the web browsers are Internet Explorer by Microsoft Corporation of Redmond, Wash. or Netscape Navigator by Netscape Communications Corporation of Mountain View, Calif.

The program also monitors the "continue" and "cancel" options (step 1210). If the Acquirer wants to cancel the entries (step 1215) and start over or quit the program, the "cancel" option is chosen and the program returns to the previous screen (step 244). If the Acquirer chooses "continue," the program begins processing the entered data and causes the display "Documents Only Form" (step 1220). To assist the Acquirer in completing the "documents only" form, the program displays information retrieved from the server 100 database, as previously disclosed, pertaining to the dispute in question (step 1225).

The Acquirer may include any comments (step 1230) before selecting the next option (step 1235). The Acquirer can "cancel" the entries (step 1240), "browse" the stored files (steps 1245 and 1250 are substantially similar to steps 1145 and 1150), or "send" the form. If "send" is chosen, the program announces "Documents Only Completed Successfully" (step 1255) and transmits the form to the server for processing (step 1260). The server routes the form to the Issuer in dispute and alerts the Issuer to the presence of the form.

External Resolver Architecture

The second exemplary architecture includes multiple embodiments that include a machine called herein, the "external resolver." The external resolver may function similar to the central server as previously described in the simple resolver architecture. Additionally, the external resolver may perform or facilitate several other functions, such as: servicing requests for dispute resolution that originate from an Issuer Host; servicing responses from Acquirer Hosts and Issuer Hosts; optionally performing routing of information between Acquirer Hosts and Issuer Hosts; optionally providing forms, XML documents, and/or XML schema; and optionally allowing Acquirer Hosts and/or Issuer Hosts to directly retrieve documents and information. In the preceding description, "optionally" means processing steps that may or may not occur, depending on the routing mechanism of the embodiment.

Figure 13:
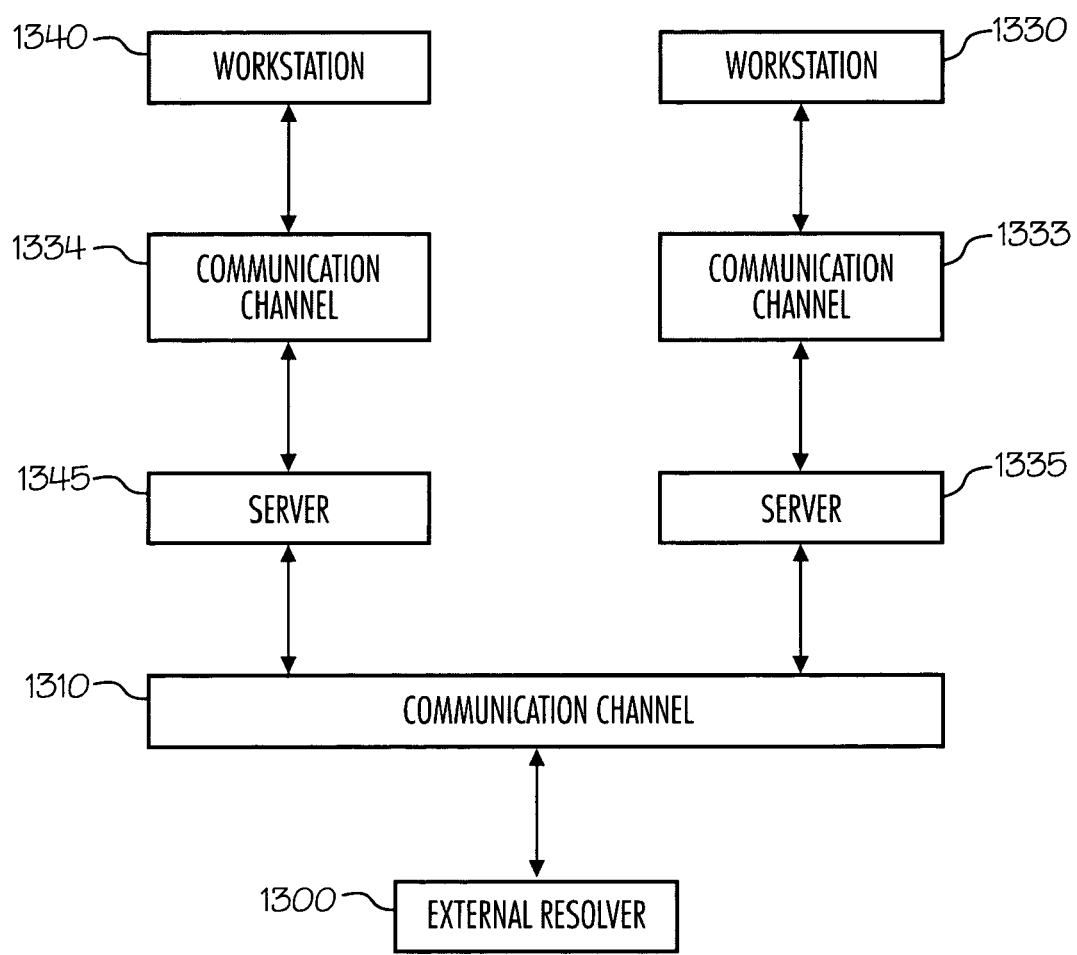
FIG. 13 illustrates a real-time dispute processing system in accordance with an exemplary "external resolver" architecture of the present invention.

Referring now to FIG. 13, an external resolver architecture system in accordance with the invention is illustrated. In this particular embodiment, workstations or terminals 1340 and 1330 are similar to previously described terminals 140 and 130 and therefore will not be described again. It should be realized that workstations 1340 and 1330 may include any of the previously described system users (e.g., cardmember, Issuer, Acquirer and S/E). Communication channel 1310 may include any suitable transmission means capable of transmitting data, such as any of the channels previously described for communication channel 110. Communication channels 1334 and 1333 may be any suitable communication channel as described above capable of interfacing and facilitating the exchange of data between a workstation and a host. In one particular embodiment, communication channel 1334 and/or 1333 are corporate intranets and are distinct from each other.

Unlike the simple resolver architecture, the external resolver architecture includes multiple servers or hosts. For example, servers 1345 and 1335 may be accessed by workstations 1340 and 1330, respectively, instead of the workstations accessing external resolver 1300 directly. This architecture permits parties to access their own servers supported by their own existing infrastructure.

Figure 14:
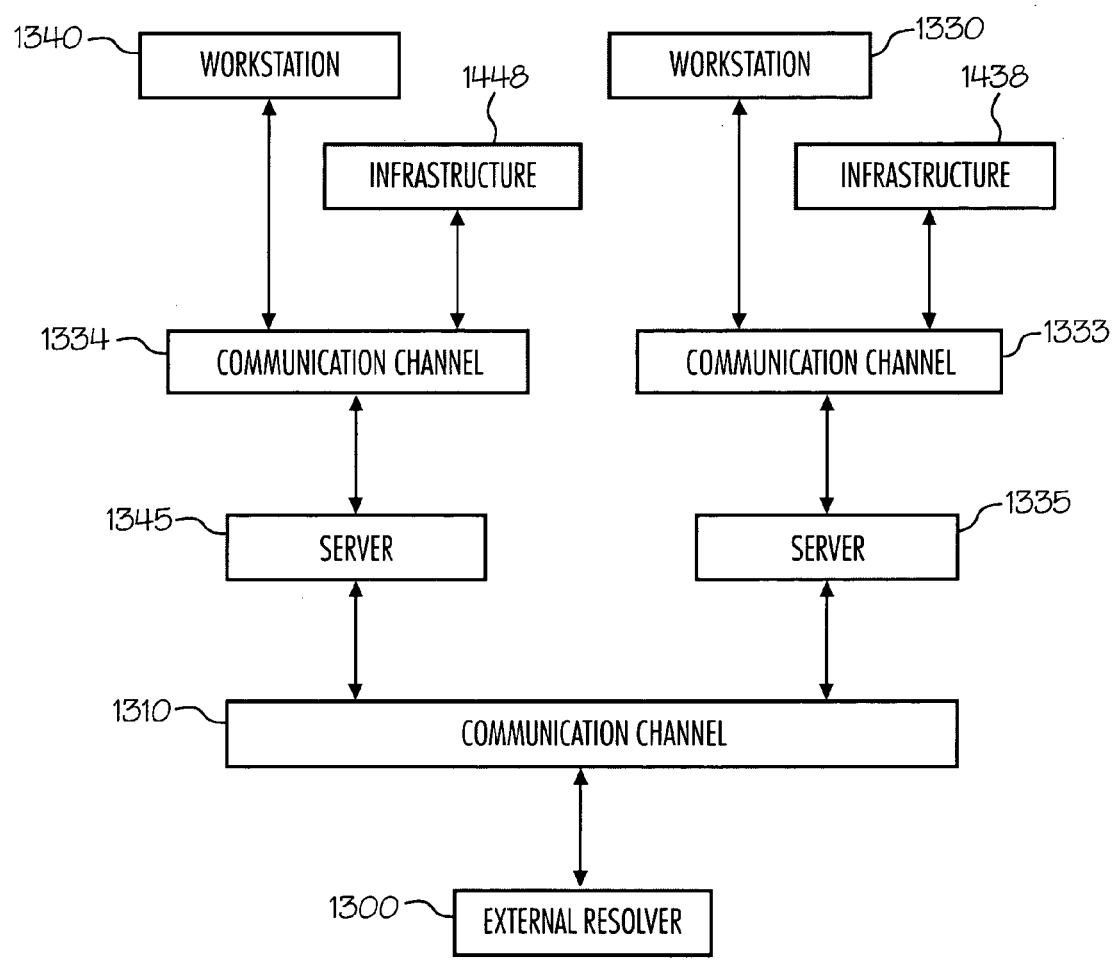
FIGS. 14 and 15 illustrate embodiments of an exemplary external resolver architecture of FIG. 13.

FIG. 14 illustrates an embodiment of the external resolver architecture which includes the user's infrastructure interfacing with the external resolver 1400. This architecture is similar to the system shown in FIG. 13, except that the present embodiment includes infrastructures 1448 and 1438. These infrastructures may include any suitable machine and/or network capable of interfacing to existing legacy systems within the user's data centers. For example, the infrastructure may include one or many machines of arbitrary hardware, operating systems, and software forms, interconnected via arbitrary communications channels and having arbitrary storage media.

When, for example, an Acquirer and Issuer seek to resolve a dispute, the Acquirer server (e.g., server 1345) and Issuer server (e.g., server 1335) are configured to use a common External Resolver 1300. This configuration may be set in a variety of ways, such as software configuration during installation, or at other times, such as when new Issuers are supported by a given Acquirer.

In one particular embodiment, workstation 1330 is for an issuer and infrastructure 1438 includes financial systems having Issuer customer servicing of cardmembers and transactional support. Additionally, workstation 1340 is an acquirer and infrastructure 1448 includes data pertaining to acquirer customer support of S/Es and electronic POS record capture. This architecture facilitates the transfer from acquirer infrastructure 1448 to acquirer server 1345 of an electronic form of ROC as would be used by an electronic POS device (for example, electronically captured digital representation of a cardmember signature on a transaction receipt). In another example, data such as transaction ID, merchant information, and cardmember information may be transmitted from issuer infrastructure 1438 to issuer server 1335. This information may be received by issuer infrastructure 1438 in a variety of ways, such as by data entry of issuer customer service or on-line customer service.

Figure 15:
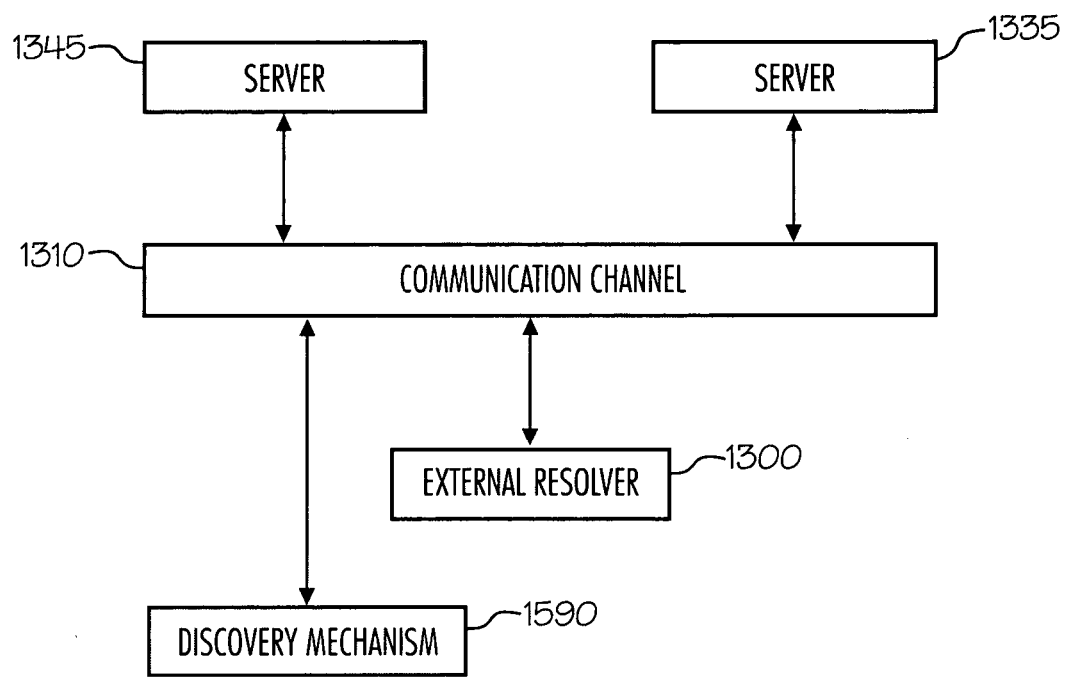

FIG. 15 is yet another embodiment of the external resolver architecture including a discovery mechanism 1590. External Resolver architectures may work in consort with dynamic discovery. In this particular embodiment, there is generally no "a priori" designation of an external resolver to be used for a specific pairing of server 1345 and server 1335. Rather, when a dispute is to be processed (or possibly at other times), discovery mechanism 1590 is used to find an appropriate external resolver 1500. Discovery mechanism 1590 may include a host which provides interfaces through which server 1335 may locate an external resolver to use for the resolution of a dispute concerning server 1345. It should be recognized that server 1335 may be any user, such as Issuer, Acquirer, cardmember or S/E.

The mechanism by which an external resolver is located may comply with a standard such as UDDI Registry (Universal Description, Discovery, and Integration). Under this scheme, one or more providers of dispute resolution services would operate external resolvers and register them with one or more UDDI registries. This may involve identifying the services by a Uniform Resource Locator (URL) and additional information such as the name and description of the service. Use of the service may also include an understanding of the data interchange and communications protocol, such as XML and possibly Simple Object Access Protocol (SOAP). Using these standards, the external resolver may publish a "web service". Note that presenting such a web service might also be achieved by other means.

In practice, the Issuer server (e.g., server 1335) would facilitate issuing a registry inquiry to discovery mechanism 1590. The inquiry may specify the request for a dispute resolver and may include additional details that further identify the type of service the Issuer server is seeking. Discovery mechanism 1590 responds with a list of suitable URLs that implement such a service. Assuming this list is non-empty, the Issuer server selects a service from the list and then initiates the next step, such as a retrieval request to an Acquirer. In an alternative embodiment, not shown, the Issuer server may also communicate with an Acquirer server (e.g., server 1345) to negotiate the selection of a mutually agreed upon external resolver. At the conclusion of such a negotiation, which can include some combination of the Issuer server and/or Acquirer server submitting inquiries to one or more discovery mechanisms, the Issuer server submits a retrieval request.

Business-to-Business (B2B) Architecture

Figure 16:
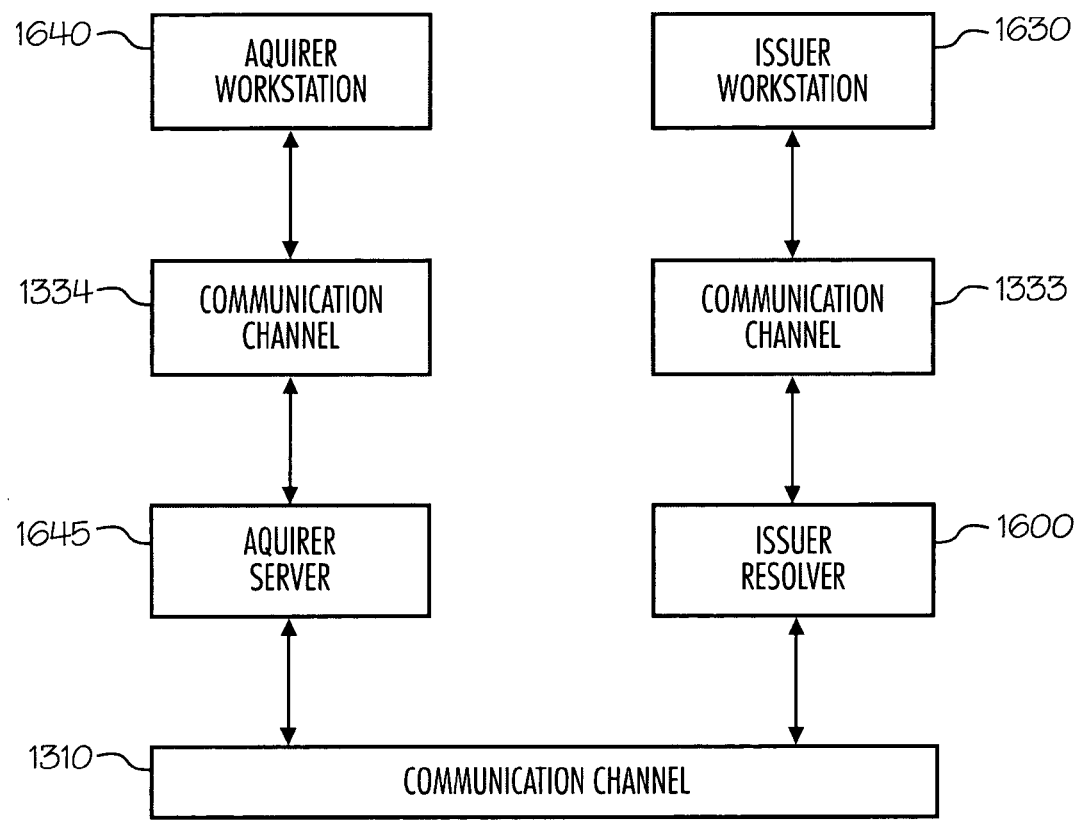
FIG. 16 illustrates a real-time dispute processing system in accordance with an exemplary "business-to-business" (B2B) architecture of the present invention.

The third exemplary architecture is the business-to-business (B2B) architecture. In this embodiment, the central server is no longer an external resolver. The central server is now an Issuer Resolver 1600 as illustrated in FIG. 16. This architecture includes a connection between Acquirer server 1645 and Issuer Resolver 1600. This connection crosses communication channel 1310, which is as described above when referring to the other two basic architectures. The B2B architecture may include some of the same properties as the external resolver architecture including, but not limited to, interfacing, routing, discovery, and scanner. Servers in the B2B architecture are similar to those of the external resolver architecture, except processing that occurs on external resolver 1300 occurs on either Acquirer server 1645 or Issuer Resolver 1600.

It should be appreciated that FIG. 16 is for illustrative purposes only and the resolver (i.e., issuer resolver 1600) may be alternatively on the Acquirer side. The parties may include the cardmember and the S/E, either in addition to or in place of the Issuer and/or the Acquirer.

Figure 17:
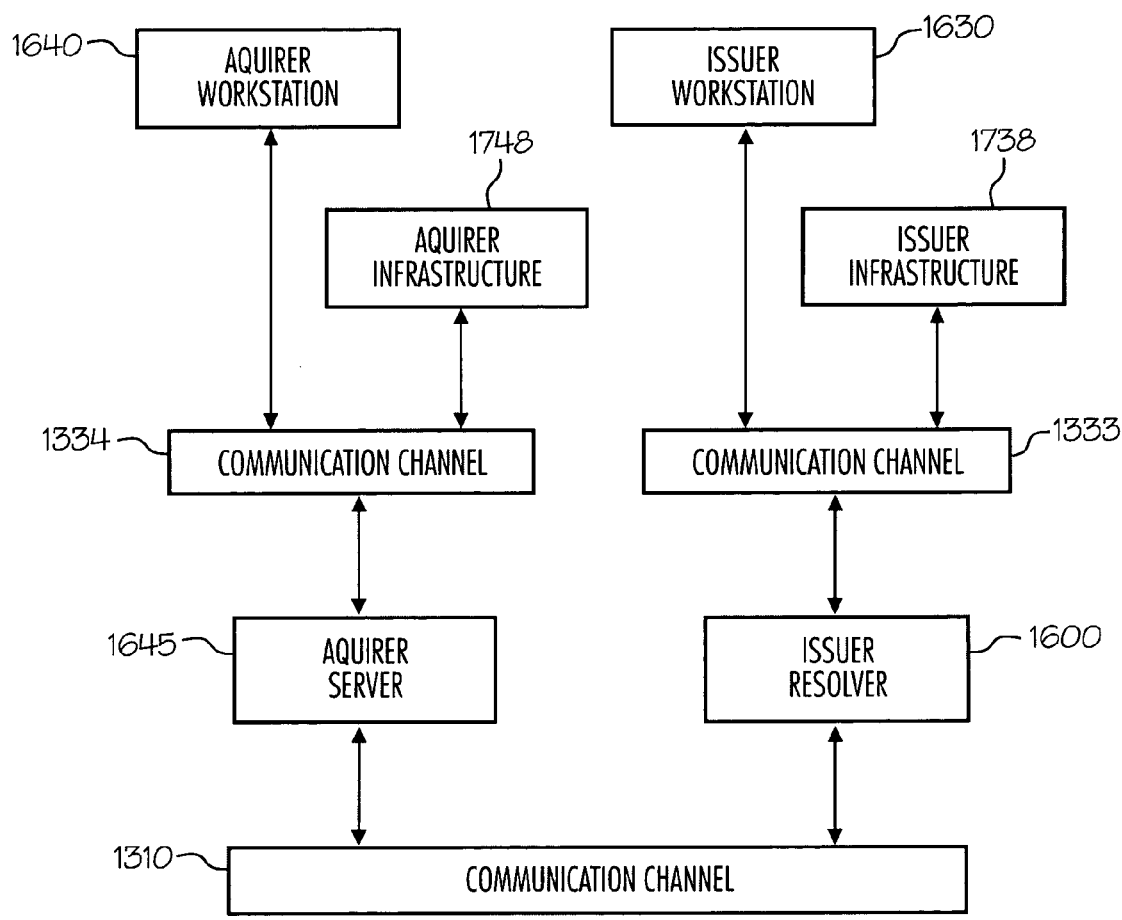
FIG. 17 illustrates an embodiment of an exemplary B2B architecture of FIG. 16.

FIG. 17 illustrates another embodiment of the B2B architecture of FIG. 16 that includes the user's infrastructure. This architecture is similar to the system shown in FIG. 16, except that the present embodiment includes infrastructures 1748 and 1738, which are similar to previously described infrastructures 1448 and 1438. Data such as transaction ID, merchant information, and cardmember information may be transmitted from Issuer infrastructure 1738 to Issuer resolver 1600. This information may be received by Issuer infrastructure 1738 through a variety of means such as data entry by Issuer customer service or on-line customer service.

In one embodiment of the dispute resolution system in accordance with the various architectures supported by the invention, the system includes a rule-driven inquiry process. This particular embodiment enables a rule-based outcome that can provide, for example, a systematic creation of a case record on the Issuer infrastructure. This system may include the key initial processes of financial adjustments and/or cardmember/Issuer correspondence. Similar processing may alternatively or additionally occur for SE/Acquirer correspondence. These communications may send additional information and/or request information and/or interaction with the system or customer service. This optional, rule-driven processing may be real-time, interactive, and/or it may operate in batch mode. Rules can perform functions such as, for example, looking for duplicate records, identifying plausible explanations, providing more detailed information including SE aliases (e.g., DBA) when an entity name differs between cardmember ROCs and statements, fraud case setup and card replacement, customer service representative viewing of customer correspondence (images and letters), update information regarding an existing dispute, cardmember cancellation of an existing dispute online, creation of a case record that contains multiple transaction disputes, online dispute correspondence between customer service and cardmember, capability for cardmember to select how they wish to be notified regarding dispute-related correspondences, and capability for customer to fax support/upload data.

Although not depicted in the diagrams, an additional embodiment of the architecture shown in the above embodiments includes the server and infrastructure residing on the same machine or system. For example, referring to FIG. 14, infrastructure 1448 is combined with server 1345 and/or infrastructure 1438 is combined with server 1335.

A further embodiment of the same architecture is hybrid interfacing where one of the infrastructures (e.g., 1448 or 1438 of FIG. 14) is absent.

The on-line system and method described and illustrated includes an automated and real-time environment for facilitating the processing of a dispute. In addition, the code-based indexing system includes an efficient process for prioritizing disputes and effectively reducing the overall dispute settling time.

Having fully described the various embodiments of the dispute resolution system and methods of the invention, it should be recognized that other embodiments fall within the scope of the invention. For example, a dispute may be initiated by the cardmember to the Issuer or the Issuer to the Acquirer. The interactions between the parties may occur by virtue of a web client that interacts with a web server as part of an Issuer infrastructure. Alternatively, the cardmember may communicate with the Issuer by means of a telephone call or conventional letter to customer service during or after which the customer service representative uses an attached terminal to either interact with the Issuer infrastructure or the Issuer workstation. Analogous variations occur for the communication between the Acquirer and SE.

Disputes may be resolved at any one of the process steps and therefore eliminating the need for further steps, such as second presentment, final chargeback, and so on.

The present invention is described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data transmission protocols and that the system described herein is merely an exemplary application for the invention.

It should be appreciated that the particular implementations shown and described herein are illustrative of the invention and its best mode and are not intended to otherwise limit the scope of the present invention in any way. Indeed, for the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

The present invention has been described above with reference to exemplary embodiments. However, those skilled in the art having read this disclosure will recognize that changes and modifications may be made to the exemplary embodiments without departing from the scope of the present invention. For example, similar forms may be added without departing from the spirit of the present invention. These and other changes or modifications are intended to be included within the scope of the present invention, as expressed in the following claims.

The detailed description of exemplary embodiments of the invention also makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description is presented for purposes of illustration only and not of limitation. For example, the steps recited in any of the method or process descriptions may be executed in any order and are not limited to the order presented.

The invention claimed is:

1. A system for facilitating handling of a post-transactional credit account dispute comprising:
   a log-in for accepting and authenticating log-in information from a user;
   an inbox for providing an electronic inbox to each user of the system, wherein the inbox allows a user to view and access all forms relating to credit account disputes to which the user has access;
   a storage device having a plurality of pre-existing dispute handling forms stored thereon, the forms having predefined content capable of being viewed and field-populated by the workstations, wherein the forms include initiator forms arranged in an initiator form selection and responder forms arranged in a responder form selection; and
   a first server in communication with the log-in, inbox, and storage device of the system as well as with a first workstation capable of receiving commands from a dispute-resolution initiator and a second workstation capable of receiving commands from a dispute-resolution responder, the initiator and the responder being users of the system,
   wherein each form that is field-populated by one of the workstations is accepted for processing only if it identifies the post-transactional credit account dispute, the initiator, and the responder, and
   wherein a field-populated initiator form is made available to the responder via an inbox corresponding to the responder and a field-populated responder form is made available to the initiator via an inbox corresponding to the initiator.

2. The system of claim 1, wherein the initiator forms comprise a Retrieval Request, a First Chargeback and a Final Chargeback, and the responder forms comprise a Fulfillment and a Second Presentment.

3. The system of claim 1, wherein said dispute-resolution initiator comprises one of an Issuer and a cardmember and said dispute-resolution responder comprises one of an Acquirer and a service establishment.

4. The system of claim 1, wherein said first server comprises a central server communicating with the first and second workstations via the World Wide Web, and wherein the forms are provided to the initiator and responder for data entry via webpages.

5. The system of claim 1, further comprising a second server wherein said first server is coupled to said the first workstation and said second server is coupled to the second workstation.

6. The system of claim 5, further comprising an external resolver in communication with said servers, said external resolver facilitating routing of information between said servers.

7. The system of claim 6, further comprising a discovery mechanism providing interfaces for said servers to locate said external resolver.

8. The system of claim 7, wherein said discovery mechanism provides suitable Uniform Resource Locators (URLs).

9. The system of claim 1 comprising a business-to-business architecture.

10. The system of claim 9, further comprising a first infrastructure in communication with the first workstation and a second infrastructure in communication with the second workstation, wherein said infrastructures provide interfacing capabilities.

11. The system of claim 1, wherein digitally-represented supporting documentation is attached to a dispute handling form.

12. A method executed in a network computer system for facilitating handling of a post-transactional credit account dispute, the network computer system having a central server, a first client system related to a dispute-resolution initiator, and a second client system related to a dispute-resolution responder, the method comprising:

providing, via the central server, the first client system access to a plurality of pre-existing dispute handling forms that have pre-defined content and are capable of being field-populated by the first client system;

accepting a first field-populated dispute handling form from the first client system, wherein the form identifies a post-transactional credit account dispute, the initiator, and the responder;

transmitting the first form to an electronic inbox corresponding to the responder and stored on the central server, thereby initiating resolution of the post-transactional credit account dispute;

providing, via the central server, the second client system access to the first form via the electronic inbox corresponding to the responder;

providing, via the central server, the second client system access to a second plurality of pre-existing dispute handling forms that have pre-defined content and are capable of being field-populated by the second client system; and accepting a second field-populated dispute handling form from the second client system, wherein the form relates to the credit account dispute and constitutes a response to the first form;

transmitting the second form to an electronic inbox corresponding to the initiator and stored on the central server; and providing, via the central server, the first client system access to the second form via the electronic inbox corresponding to the initiator.

13. The method of claim 12, wherein the dispute-resolution initiator comprises said one of an Issuer and a cardmember and the dispute-resolution responder comprises one of an Acquirer and a service establishment.

14. The method of claim 12, wherein said transmitting comprises Extensible Markup Language (XML) schema.

15. The method of claim 12, wherein said transmitting occurs via a business-to-business architecture.

16. The method of claim 12, wherein said transmitting occurs via an external resolver architecture such that the first client system includes a first server and the second client system includes a second server.

17. The method of claim 12, wherein digitally-represented supporting documentation is attached to a dispute handling form.

* * * * *